(12) United States Patent
Chen et al.

(10) Patent No.: US 10,908,352 B1
(45) Date of Patent: Feb. 2, 2021

(54) BACK PLATE INCLUDING RECEIVING SLOTS BACK PLATE ASSEMBLY, BACKLIGHT MODULE AND DISPLAY DEVICE

(71) Applicants: K-Tronics (Suzhou) Technology Co., Ltd., Jiangsu (CN); BOE Technology Group Co., Ltd., Beijing (CN)

(72) Inventors: Liri Chen, Beijing (CN); Qingen Zhou, Beijing (CN); Rongshun Zhang, Beijing (CN)

(73) Assignees: K-TRONICS (SUZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/830,547

(22) Filed: Mar. 26, 2020

(30) Foreign Application Priority Data

Aug. 15, 2019 (CN) .......................... 2019 1 0757332

(51) Int. Cl.
*F21V 8/00* (2006.01)

(52) U.S. Cl.
CPC ................... *G02B 6/0088* (2013.01)

(58) Field of Classification Search
CPC .................................................. G02B 6/0088
See application file for complete search history.

(56) References Cited

FOREIGN PATENT DOCUMENTS

WO    WO-2016078120 A1 *  5/2016  .............. G02B 6/00

\* cited by examiner

*Primary Examiner* — Joseph L Williams
(74) *Attorney, Agent, or Firm* — Westman, Champlin & Koehler, P.A.

(57) ABSTRACT

A back plate includes: a bottom plate; side plates on the same side of the bottom plate, wherein an accommodation space enclosed by both the bottom plate and the side plates is formed, the side plates include a first side plate including an inner surface facing the accommodation space; and receiving slots which are respectively located in the side plates and include a first receiving slot in the first side plate. The first receiving slot penetrates the first side plate in a first direction. The first receiving slot includes a receiving head, a positioning portion and a receiving tail, which are sequentially arranged from a slot bottom toward a slot opening in a second direction. A size of at least a part of the positioning portion in a third direction is greater than a size of each of the receiving head and the receiving tail in the third direction.

20 Claims, 26 Drawing Sheets

BACK PLATE INCLUDING RECEIVING SLOTS BACK PLATE ASSEMBLY, BACKLIGHT MODULE AND DISPLAY DEVICE

CROSS-REFERENCE TO RELATED APPLICATION

This application claims the benefit of Chinese Patent Application No. 201910757332.7 filed on Aug. 15, 2019 in the National Intelligent Property Administration of China, the whole disclosure of which is incorporated herein by reference.

TECHNICAL FIELD

The present disclosure relates to the field of display technology, and in particular, to a back plate, a back plate assembly, a backlight module, and a display device.

BACKGROUND

For example, display devices such as liquid crystal display device (also referred to as LCD) has advantages such as thin body, less power consumption and no radiation, so that they have been widely used. An existing liquid crystal display device typically include a liquid crystal display panel and a backlight module. The liquid crystal display panel is operated according to a principle in which liquid crystal molecules between two parallel glass substrates are provided so that light emitted by the backlight module is controllable by controlling deflections of the liquid crystal molecules so as to display different images.

In the backlight module, it is necessary to position optical elements such as light guide plate and optical sheets on a back plate. With the continuous development of the liquid crystal display devices, the liquid crystal display device is gradually developing towards ultra-thin, narrow-frame and frameless directions. In ultra-thin, narrow-frame and frameless display devices, how to position the optical elements in the backlight module is one of key issues for researchers.

SUMMARY

In an aspect, a back plate is provided, including: a bottom plate; a plurality of side plates on the same side of the bottom plate, wherein an accommodation space enclosed by both the bottom plate and the plurality of side plates is formed, the plurality of side plates include a first side plate, and the first side plate includes an inner surface facing the accommodation space; and a plurality of receiving slots, wherein the plurality of receiving slots are respectively located in the plurality of side plates, and the plurality of receiving slots include a first receiving slot in the first side plate, wherein, the first receiving slot penetrates the first side plate in a first direction, and the first direction is perpendicular to the inner surface of the first side plate; the first receiving slot includes a slot opening and a slot bottom, the slot opening is located on a side of the first receiving slot distal to the bottom plate in a second direction, the slot bottom is located on a side of the first receiving slot near the bottom plate in the second direction, the bottom plate includes an inner surface facing the accommodation space, and the second direction is perpendicular to the inner surface of the bottom plate; the first receiving slot includes a receiving head, a positioning portion and a receiving tail, and the receiving head, the positioning portion and the receiving tail are sequentially arranged from the slot bottom toward the slot opening in the second direction; and a size of at least a part of the positioning portion in a third direction is greater than a size of each of the receiving head and the receiving tail in the third direction, and the third direction is perpendicular to both the first direction and the second direction.

For example, the back plate includes a first corner, the plurality of side plates further include a second side plate, and the second side plate is connected with the first side plate at the first corner; and the plurality of receiving slots further include a second receiving slot in the second side plate.

For example, the second receiving slot penetrates the second side plate in the third direction; the second receiving slot includes a slot opening and a slot bottom, the slot opening of the second receiving slot is located on a side of the second receiving slot distal to the bottom plate in the second direction, and the slot bottom of the second receiving slot is located on a side of the second receiving slot near the bottom plate in the second direction; the second receiving slot includes a receiving head, a positioning portion and a receiving tail, and the receiving head, the positioning portion and the receiving tail of the second receiving slot are sequentially arranged from the slot bottom of the second receiving slot toward the slot opening of the second receiving slot in the second direction; and a size of at least a part of the positioning portion of the second receiving slot in the first direction is greater than a size of each of the receiving head and the receiving tail of the second receiving slot in the first direction.

For example, the first receiving slot further includes a first slot wall and a second slot wall, the first slot wall and the second slot wall are respectively located on opposite sides of the first receiving slot in the third direction, and the first slot wall and the second slot wall each include a circular arc surface portion at the positioning portion of the first receiving slot; and/or the second receiving slot further includes a first slot wall and a second slot wall, the first slot wall of the second receiving slot and the second slot wall of the second receiving slot are respectively located on opposite sides of the second receiving slot in the first direction, and the first slot wall of the second receiving slot and the second slot wall of the second receiving slot each include a circular arc surface portion at the positioning portion of the second receiving slot.

For example, an orthographic projection of the circular arc surface portion of the first slot wall of the first receiving slot on the first side plate and an orthographic projection of the circular arc surface portion of the second slot wall of the first receiving slot on the first side plate are concentric; and/or an orthographic projection of the circular arc surface portion of the first slot wall of the second receiving slot on the second side plate and an orthographic projection of the circular arc surface portion of the second slot wall of the second receiving slot on the second side plate are concentric.

For example, the first slot wall of the first receiving slot and the second slot wall of the first receiving slot each include a planar surface portion at the receiving head of the first receiving slot, and the first slot wall of the first receiving slot and the second slot wall of the first receiving slot each include a planar surface portion at the receiving tail of the first receiving slot; and/or the first slot wall of the second receiving slot and the second slot wall of the second receiving slot each include a planar surface portion at the receiving head of the second receiving slot, and the first slot wall of the second receiving slot and the second slot wall of the second receiving slot each include a planar surface portion at the receiving tail of the second receiving slot.

For example, the back plate further includes a first notch at the first corner, wherein the first notch is spaced apart from the first receiving slot, and the first notch is spaced apart from the second receiving slot.

For example, the back plate further includes a second corner, a third corner and a fourth corner, the plurality of side plates further include a third side plate and a fourth side plate, the second side plate is connected with the third side plate at the second corner, the third side plate is connected with the fourth side plate at the third corner, and the fourth side plate is connected with the first side plate at the fourth corner; and the plurality of receiving slots further include a third receiving slot and a fourth receiving slot which both are adjacent to the second corner, the third receiving slot is disposed in the third side plate, the fourth receiving slot is disposed in the second side plate, the third receiving slot has the same structure as the first receiving slot, and the fourth receiving slot has the same structure as the second receiving slot; and/or, the plurality of receiving slots further include a fifth receiving slot and a sixth receiving slot which both are adjacent to the third corner, the fifth receiving slot is disposed in the third side plate, the sixth receiving slot is disposed in the fourth side plate, the fifth receiving slot has the same structure as the first receiving slot, and the sixth receiving slot has the same structure as the second receiving slot; and/or, the plurality of receiving slots further include a seventh receiving slot and an eighth receiving slot which both are adjacent to the fourth corner, the seventh receiving slot is disposed in the first side plate, the eighth receiving slot is disposed in the fourth side plate, the seventh receiving slot has the same structure as the first receiving slot, and the eighth receiving slot has the same structure as the second receiving slot.

For example, the back plate further includes a second corner, the plurality of side plates further include a third side plate, and the second side plate is connected with the third side plate at the second corner; and the back plate further includes a sink at the second corner, and the sink is located in the bottom plate.

In another aspect, a back plate assembly is provided, including: the back plate as described above; and a plurality of buffer members including a first buffer member, wherein at least a part of the first buffer member is adapted to be inserted into the first receiving slot and the second receiving slot.

For example, the first buffer member includes: a first body including a first arm on a side of the first side plate facing the accommodation space; and a second arm on a side of the second side plate facing the accommodation space; a second body including a third arm on a side of the first side plate facing away from the accommodation space; and a fourth arm on a side of the second side plate facing away from the accommodation space; a first insertion portion between the first arm and the third arm, the first insertion portion being adapted to be inserted into the first receiving slot; and a second insertion portion between the second arm and the fourth arm, the second insertion portion being adapted to be inserted into the second receiving slot.

For example, the first buffer member includes: a first body including a first arm on a side of the first side plate facing the accommodation space; and a second arm on a side of the second side plate facing the accommodation space; a first insertion portion on a side of the first arm facing away from the accommodation space, the first insertion portion being adapted to be inserted into the first receiving slot; and a second insertion portion on a side of the second arm facing away from the accommodation space, the second insertion portion being adapted to be inserted into the second receiving slot.

For example, the first insertion portion includes an insertion head, a positioning part and an insertion tail, and a size of at least a part of the positioning part in the third direction is greater than a size of each of the insertion head and the insertion tail in the third direction.

For example, the first buffer member includes an elastic material.

For example, the positioning part of the first insertion portion is elastically deformable under a pressing action to pass through the receiving tail of the first receiving slot, and is restorable in response to removing the press action to be clamped on the positioning portion of the first receiving slot.

For example, the size of the insertion head in the third direction is no greater than the size of the receiving head in the third direction, the size of the positioning part in the third direction is no greater than the size of the positioning portion in the third direction, and the size of the insertion tail in the third direction is no greater than the size of the receiving tail in the third direction.

For example, the positioning part includes two circular arc surface parts, the two circular arc surface parts of the positioning part are located on opposite sides of the positioning part in the third direction, orthographic projections of the two circular arc surface parts of the positioning part on the first arm are concentric.

For example, the back plate further includes a second corner, a third corner and a fourth corner, the plurality of side plates further include a third side plate and a fourth side plate, the second side plate is connected with the third side plate at the second corner, the third side plate is connected with the fourth side plate at the third corner, and the fourth side plate is connected with the first side plate at the fourth corner; and the plurality of buffer members further include a second buffer member adjacent to the second corner, a third buffer member adjacent to the third corner, and a fourth buffer member adjacent to the fourth corner, and at least one of the second buffer member, the third buffer member and the fourth buffer member is identical in structure to the first buffer member.

For example, the first arm includes a first top surface distal to the bottom plate in the second direction, the second arm includes a second top surface distal to the bottom plate in the second direction, and the first top surface and the second top surface respectively extend to the second body to form a platform.

For example, the first buffer member further includes an avoiding notch at the first corner, and the avoiding notch is located on an inner surface of the second body facing the accommodation space.

In a further aspect, a backlight module is provided, including the back plate assembly as described above.

In another further aspect, a display device is provided, including the backlight module as described above.

BRIEF DESCRIPTION OF THE DRAWINGS

Other objects and advantages of the present disclosure will become apparent from the following descriptions of the present disclosure with reference to accompanying drawings, which may help a comprehensive understanding of the present disclosure.

Figure 1:
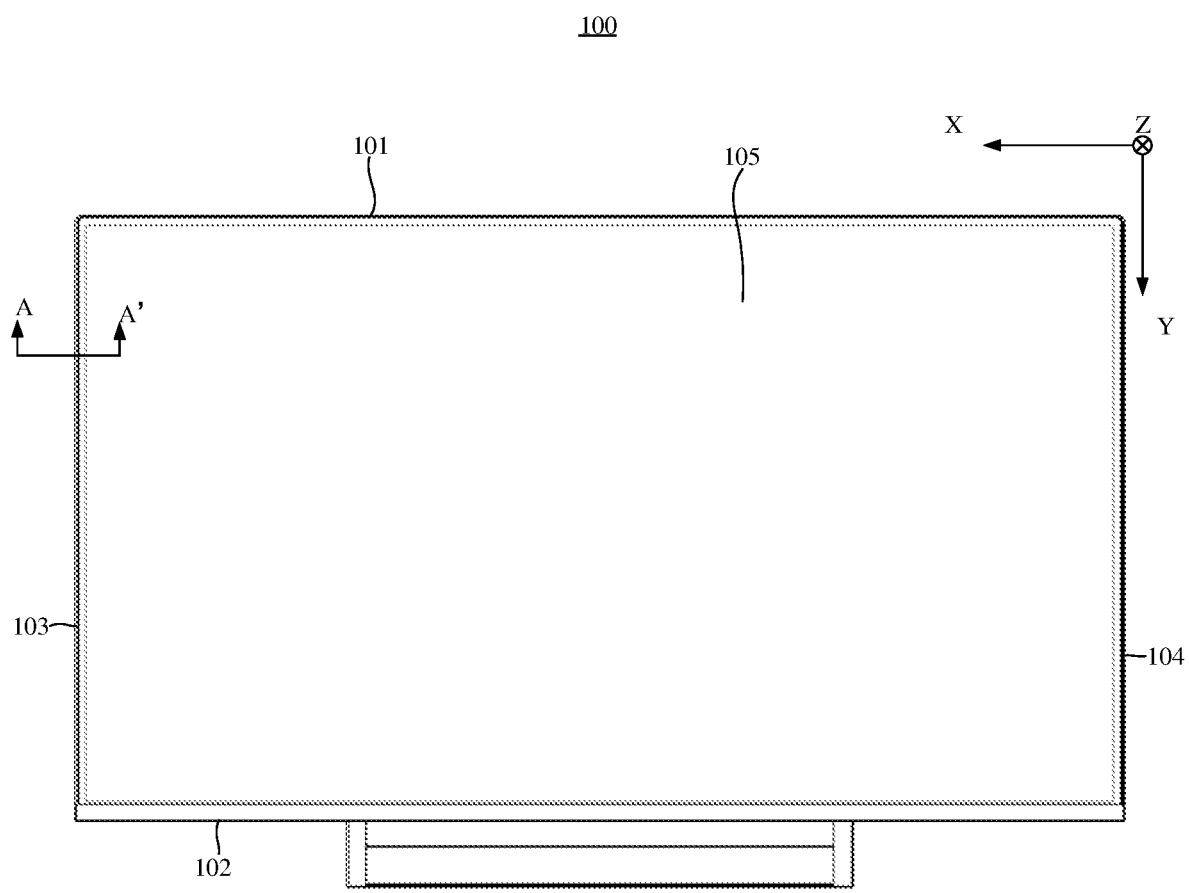
FIG. 1 is a front view of a display device according to some embodiments of the present disclosure.

It should be noted that, for the sake of clarity, dimensions of layers, structures or regions may be enlarged or reduced in the drawings for describing the embodiments of the present disclosure, that is, these drawings are not drawn to actual scale.

DETAILED DESCRIPTION OF EMBODIMENTS

In order to make objectives, technical solutions and advantages of embodiments of the present disclosure more clear, the technical solutions of the embodiments of the present disclosure will be described clearly and completely in combination with drawings of the embodiments of the present disclosure. Obviously, the described embodiments are a part of the embodiments of the present disclosure, rather than all the embodiments of the present disclosure. Based on the described embodiments of the present disclosure, all other embodiments obtained by those skilled in the art without creative labor shall fall within the protection scope of the present disclosure.

Unless otherwise defined, technical terms or scientific terms used in the present disclosure shall have ordinary meanings as understood by those skilled in the art. The terms such as "first", "second" and the like used in this context do not indicate any order, quantity, or importance, but are only used to distinguish different components. Words such as "include", "including", "comprise", "comprising" and the like mean that an element or item preceding the words contains elements or items following the words and equivalents of the elements or items, without excluding other elements or items.

In this context, unless otherwise specified, directional terms such as "upper", "lower", "left", "right", "inside", "outside" and the like are used to indicate orientational or positional relationships based on the drawings, and they are used merely to facilitate describing the present disclosure, rather than indicating or implying that devices, elements or components which are modified by these terms must have particular orientations, or be constructed or operated in particular orientations. It should be understood that, when absolute positions of the described objects change, relative position relationships which are described by these terms may also change accordingly. Therefore, these directional terms cannot be understood as limiting the present disclosure.

Figure 2:
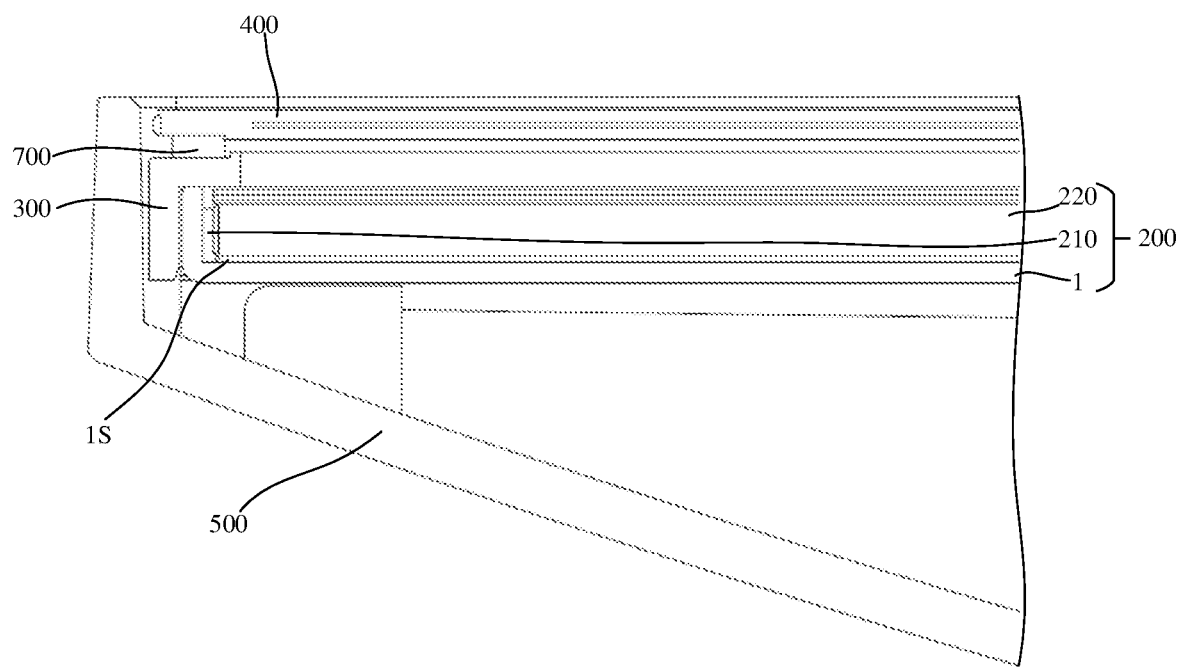
FIG. 2 is a partial cross-sectional view of a display device, which is taken along line AA' in FIG. 1, according to some embodiments of the present disclosure.

FIG. 1 is a front view of a display device according to some embodiments of the present disclosure, and FIG. 2 is a partial cross-sectional view, which is taken along line AA' in FIG. 1, of a display device according to some embodiments of the present disclosure.

It should be noted that in this context, for convenience of description, an XYZ spatial coordinate system is established. Referring to FIG. 1 and FIG. 2, a display device 100 includes four side frames, that is, a first side frame 101 located on an upper side (also referred to as a sky side) in FIG. 1, a second side frame 102 located on a lower side (also referred to as a ground side) in FIG. 1, a third side frame 103 on a left side in FIG. 1, and a fourth side frame 104 on a right side in FIG. 1. The display device 100 further includes a display face 105 which is configured to display information such as text and image for a user's observation. For example, in FIG. 1, a surface which is parallel to a paper surface and faces the reader is the display face 105. For example, an X direction may be a direction parallel to the first side frame 101 or the second side frame 102, a Y direction may be a direction parallel to the third side frame 103 or the fourth side frame 104, and a Z direction may be a direction perpendicular to the display face 105. In FIG. 1, the Z direction is shown as a direction perpendicular to the paper surface. It should also be noted that in this context, the Y direction may be referred to as a first direction, the Z direction may be referred to as a second direction, and the X direction may be referred to as a third direction. It should be noted that expressions such as the XYZ spatial coordinate system, the X direction, the Y direction, and the Z direction are only for the convenience of describing the embodiments of the present disclosure, and should not be construed as limiting the present disclosure.

Referring to FIG. 2, the display device 100 may include components such as a backlight module 200, a middle frame 300, a display panel 400, and a rear case 500. A module which is formed by the components such as the backlight module 200, the middle frame 300 and the display panel 400 may be fixed onto the rear case 500 by fixing means such as screws.

For example, the backlight module 200 may be an edge-lit backlight module. Specifically, the backlight module 200 may include a back plate assembly, a light source 210, a light guide plate 220, and an optical film group. For example, the optical film group may include optical films such as a diffusion sheet and a light enhancement film. It should be understood that the optical film group may also include other types of optical films, which may be selected according to actual use needs. For example, the light source 210 may include a plurality of light emitting diodes (LEDs). As shown in FIG. 2, the light source 210 may be disposed at one side of the light guide plate 220, and a surface, which is located at the side, of the light guide plate, may be referred to as a light incident surface of the light guide plate 220. Light emitted from the light source 210 is scattered by the light guide plate 220, then is emitted from a light exit surface of the light guide plate 220, and then passes through the optical film group, so that the light source may form an area light source.

For example, the display panel 400 may be a liquid crystal display panel and includes two substrates disposed opposite to each other. For example, the two substrates may be an array substrate and a color filter substrate, respectively. It should be understood that the liquid crystal display panel 400 may further include a liquid crystal layer disposed between the array substrate and the color filter substrate. Base substrates of the array substrate and the color filter substrate may be glass substrates. In addition, it should be noted that the array substrate and the color filter substrate may adopt structures of the array substrate and the color filter substrate commonly used in the related art, which are not described herein again.

Referring to FIG. 2, the back plate assembly includes a back plate 1. The back plate 1 has an accommodation space 1S for accommodating components such as the light guide plate 220 and the optical film group. The display panel 400 is supported by the middle frame 300. For example, a buffer element 700 such as a buffer foam is provided between the display panel 400 and a support surface of the middle frame 300.

Figure 3:
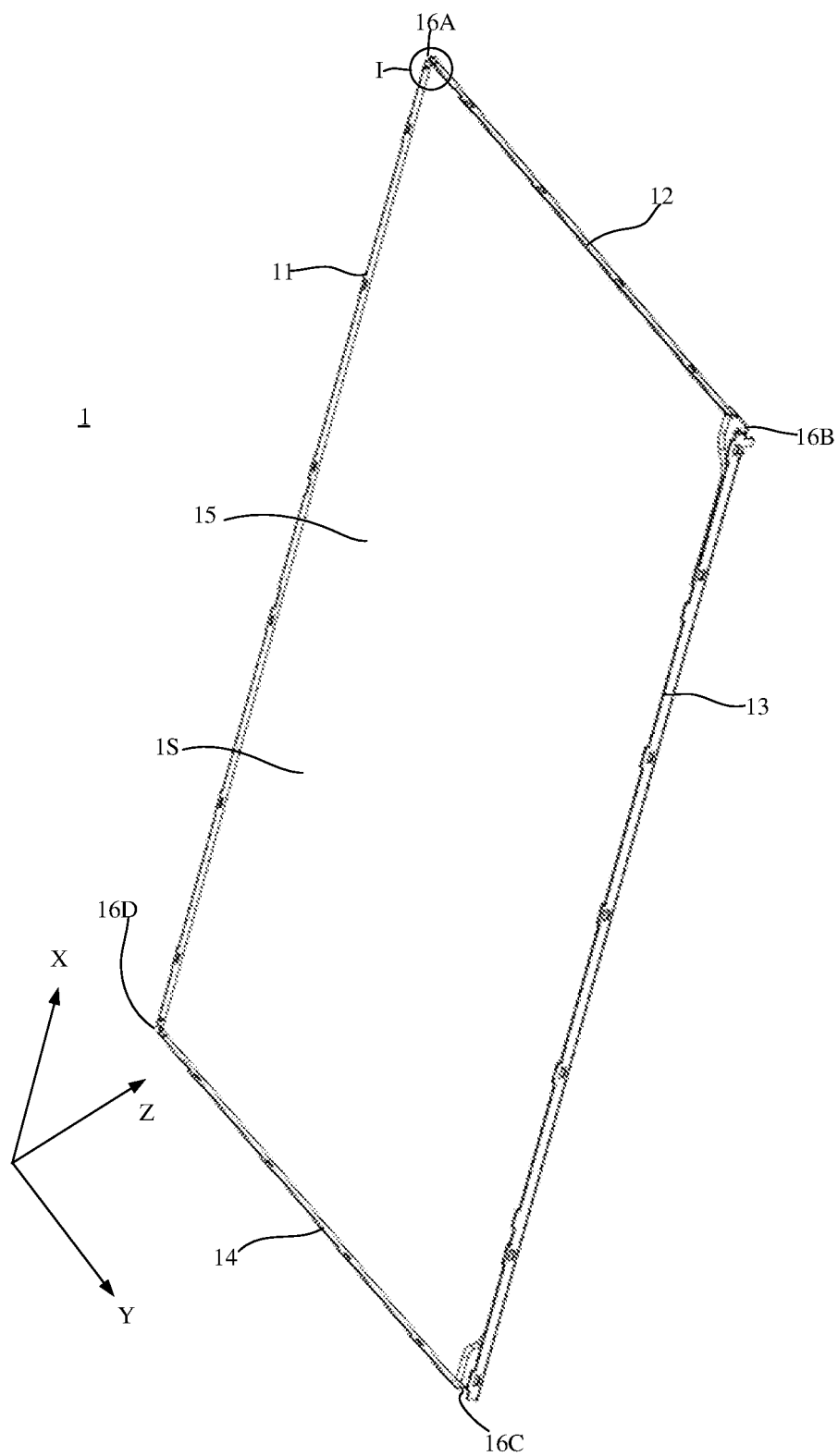
FIG. 3 is a perspective view of a back plate according to some embodiments of the present disclosure.

FIG. 3 is a perspective view of a back plate according to some embodiments of the present disclosure. Referring to FIG. 3, the back plate 1 includes a bottom plate 15 and a plurality of side plates. For example, the back plate 1 may include four side plates, which include a first side plates 11, a second side plate 12, a third side plate 13, and a fourth side plate 14. In use, the bottom plate 15 is parallel to the display face of the display device, the first side plate 11 is located on the sky side, the third side plate 13 is located on the ground side, and the second side plate 12 and the fourth side plate 14 are located on the right side and the left side, respectively. The second side plate 12 and the fourth side plate 14 respectively connect the first side plate 11 with the third side plate 13. As shown in FIG. 3, the first side plate 11 and the third side plate 13 are parallel to each other and extend in the X direction, the second side plate 12 and the fourth side plate 14 are parallel to each other and extend in the Y direction, and each of the first side plate 11 and the third side plate 13 is substantially perpendicular to each of the second side plate 12 and the fourth side plate 14. The Z direction is perpendicular to the back plate 15.

The back plate 1 further includes a plurality of corners. For example, the back plate 1 may include four corners, which include a first corner 16A, a second corner 16B, a third corner 16C, and a fourth corner 16D. The first corner 16A is located at a junction between the first side plate 11 and the second side plate 12. The second corner 16B is located at a junction between the second side plate 12 and the third side plate 13. The third corner 16C is located at a junction between the third side plate 13 and the fourth side plate 14. The fourth corner 16D is located at a junction between the fourth side plate 14 and the first side plate 11.

As shown in FIG. 3, the four side plates 11, 12, 13, 14 protrude relative to the bottom plate 15 in the Z direction, and are located on the same side of the bottom plate 15, so that the accommodation space 1S is collectively formed and enclosed by the four side plates 11, 12, 13, 14 and the bottom plate 15.

Herein, for convenience of description, a side of the back plate facing the accommodation space is referred to as an "inner side", and a side of the back plate facing away from the accommodation space is referred to as an "outer side". It needs to be pointed out that directional expressions such as "inner" and "outer" are merely for the convenience of describing the embodiments of the present disclosure, and should not be construed as limiting the present disclosure.

In the embodiments of the present disclosure, the back plate 1 may have a one-piece structure, that is, the back plate 1 is a component which is formed by an integrally molding process. For example, an integrated back plate blank may be formed by a process such as machining process or stamping process, and then a periphery of the back plate blank is bent by a bending process to form four side plates. For example, the back plate 1 may be made of metal materials such as iron, aluminum, stainless steel, or the like.

Figure 4:
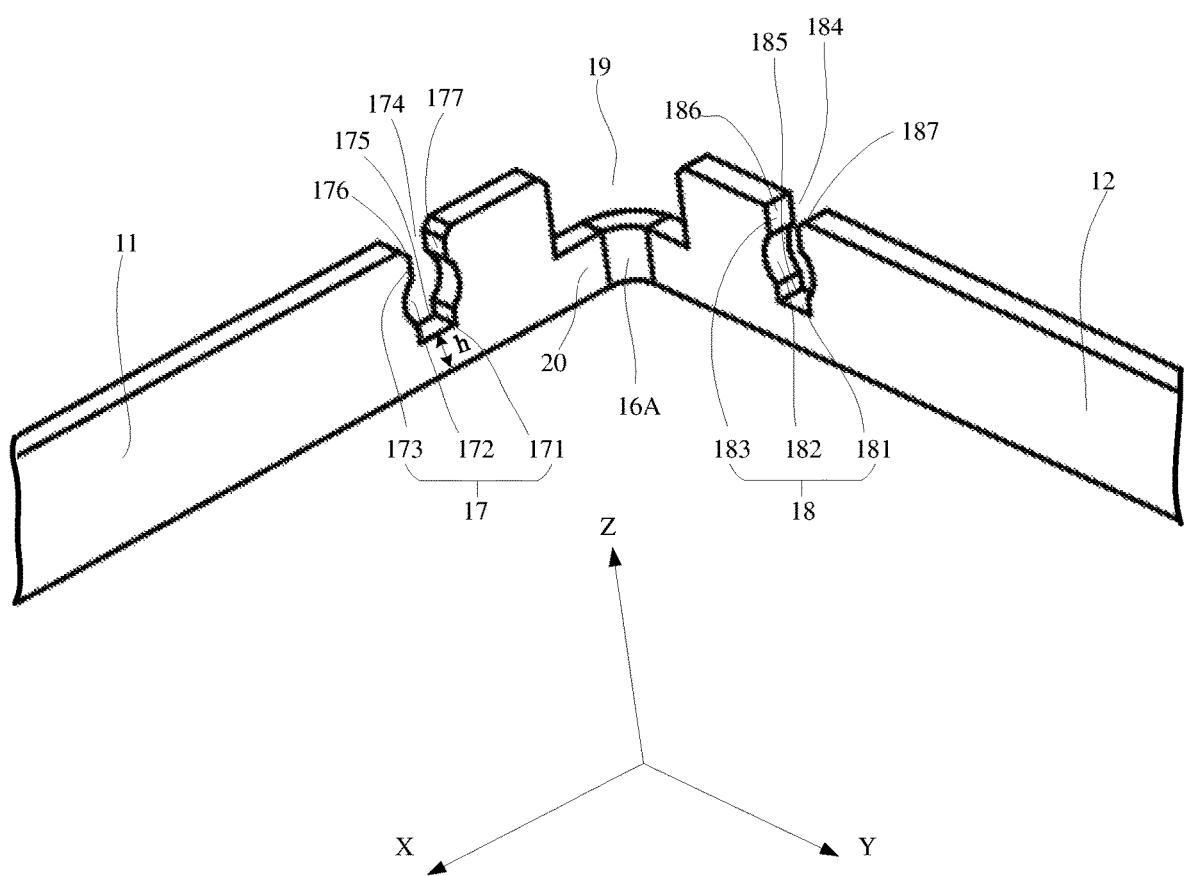
FIG. 4 is a partially enlarged view of part I of the back plate shown in FIG. 3.

FIG. 4 is a partially enlarged view of a part I of the back plate shown in FIG. 3. For example, the part I is a part which is located at the first corner 16A (that is, at the junction between the first side plate 11 and the second side plate 12).

Referring to FIG. 4, the back plate 1 may include a receiving slot located in the side plates thereof.

For example, the receiving slot may include a first receiving slot 17 in the first side plate 11. The first receiving slot 17 is disposed adjacent to the first corner 16A. The first receiving slot 17 is spaced apart from the first corner 16A by a certain interval in the X direction. The first receiving slot 17 penetrates the first side plate 11 in the Y direction, that is, the first receiving slot 17 penetrates the entire thickness of the first side plate 11. The first receiving slot 17 does not penetrate the first side plate 11 in the Z direction.

Specifically, the first receiving slot 17 has a slot opening 174, a slot bottom 175, a first slot wall 176, and a second slot wall 177. The slot opening 174 is located on a side of the first receiving slot 17 distal to the bottom plate 15 in the Z direction. The slot bottom 175 is located on a side of the first receiving slot 17 near the bottom plate 15 in the Z direction. That is, the slot opening 174 and the slot bottom 175 are located on opposite sides of the first receiving slot 17 in the Z direction, respectively. The slot bottom 175 is spaced from the bottom plate 15 by a predetermined distance h in the Z direction. The first slot wall 176 and the second slot wall 177 are respectively located on opposite sides of the first receiving slot 17 in the X direction, and they are both located between the slot opening 174 and the slot bottom 175 in the Z direction.

More specifically, the first receiving slot 17 may include three portions, that is, a receiving head 171, a positioning portion 172, and a receiving tail 173. The receiving head 171, the positioning portion 172 and the receiving tail 173 are sequentially arranged from the slot bottom 175 toward the slot opening 174 in the Z direction. A size (i.e., width) of the positioning portion 172 in the X direction is greater than a size (i.e., width) of each of the receiving portion 171 and the receiving tail 173 in the X direction.

Figure 5:
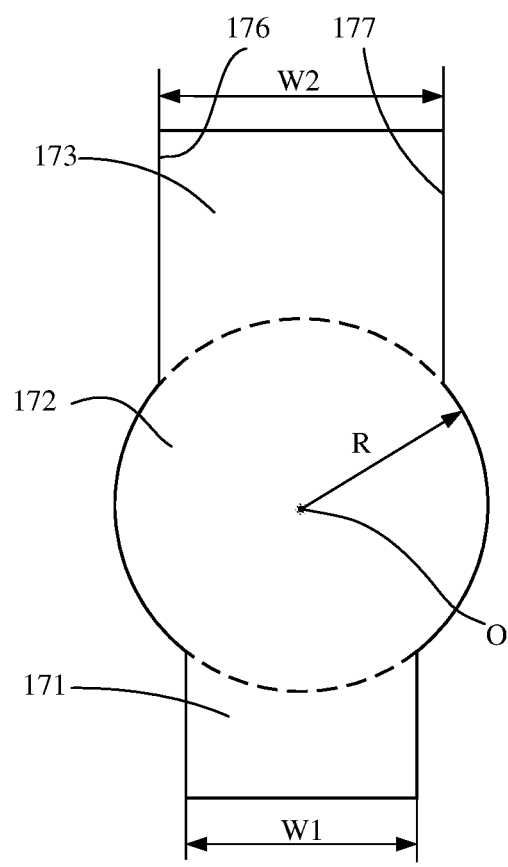
FIG. 5 is a schematic view of a projection of a receiving slot of a back plate according to some embodiments of the present disclosure.

For example, FIG. 5 is a plan view of a receiving slot included in a back plate according to some embodiments of the present disclosure. For example, FIG. 5 may be a schematic view of a projection of the first receiving slot 17 in the XZ plane (i.e., in the Y direction). Referring to FIG. 4 and FIG. 5, the first slot wall 176 and the second slot wall 177 respectively include circular arc surface portions at the positioning portion 172, the first slot wall 176 and the second slot wall 177 respectively include planar surface portions at the receiving head 171, and the first slot wall 176 and the second slot wall 177 respectively include planar surface portions at the receiving tail 173. As shown in FIG. 5, a projection of the receiving head 171 in the XZ plane has a substantially rectangular shape, a projection of the receiving tail 173 in the XZ plane also has a substantially rectangular shape, and a projection of the positioning portion 172 in the XZ plane has a drum shape. For example, the two circular arc surface portions of the first and second slot walls 176, 177 at the positioning portion 172 have a common circular center or spherical center, as indicated by O in FIG. 5. A projection of the two circular arc surface portions in the XZ plane is a segment of a circle (such as a circle indicated by a dashed line in FIG. 5) which has a circular center indicated by O and a radius indicated by R. The size (i.e., width) of the positioning portion 172 in the X direction may be expressed as 2R. The size (i.e., width) of the receiving head 171 in the X direction is equal to a side length of the rectangular shape, and is denoted as W1. The size (i.e., width) of the receiving tail 173 in the X direction is equal to a side length of the rectangular shape, and is denoted as W2. As described above, the size (i.e., width) of the positioning portion 172 in the X direction is greater than the size (i.e., width) of each of the receiving head 171 and the receiving tail 173 in the X direction, that is, 2R>W1 and 2R>W2. Optionally, the size (i.e., width) W1 of the receiving head 171 in the X direction may be equal to the size (i.e., width) W2 of the receiving tail 173 in the X direction, that is, W1=W2. Optionally, the size (i.e., width) W1 of the receiving head 171 in the X direction may be smaller than the size (i.e., width) W2 of the receiving tail 173 in the X direction, that is, W1<W2.

Referring back to FIG. 4, the receiving slot may further include a second receiving slot 18 located in the second side plate 12. The second receiving slot 18 is disposed adjacent to the first corner 16A. The second receiving slot 18 is spaced apart from the first corner 16A by a certain interval in the Y direction. The second receiving slot 18 penetrates the second side plate 12 in the X direction, that is, the second receiving slot 18 penetrates the entire thickness of the second side plate 12. The second receiving slot 18 does not penetrate the second side plate 12 in the Z direction.

Specifically, the second receiving slot 18 includes a slot opening 184, a slot bottom 185, a first slot wall 186, and a second slot wall 187. The slot opening 184 is located on a side of the second receiving slot 18 distal to the bottom plate 15 in the Z direction. The slot bottom 185 is located on a side of the second receiving slot 18 near the bottom plate 15 in the Z direction. That is, the slot opening 184 and the slot bottom 185 are located on opposite sides of the second receiving slot 18 in the Z direction, respectively. The slot bottom 185 is spaced from the bottom plate 15 in the Z direction by a predetermined distance h, which is equal to the distance by which the slot bottom 175 is spaced from the bottom plate 15 in the Z direction. The first slot wall 186 and the second slot wall 187 are respectively located on opposite sides of the second receiving slot 18 in the Y direction, and they are both located between the slot opening 184 and the slot bottom 185 in the Z direction.

More specifically, the second receiving slot 18 may include three portions, that is, a receiving head 181, a positioning portion 182, and a receiving tail 183. The receiving head 181, the positioning portion 182, and the receiving tail 183 are sequentially arranged from the slot bottom 185 toward the slot opening 184 in the Z direction. A size (i.e., width) of the positioning portion 182 in the Y direction is greater than a size (i.e., width) of each of the receiving head 181 and the receiving tail 183 in the Y direction.

For example, FIG. 5 may be a schematic view of a projection of the second receiving slot 18 in the YZ plane (i.e., in the X direction). Referring to FIG. 4 and FIG. 5, the first slot wall 186 and the second slot wall 187 respectively include circular arc surface portions at the positioning portion 182, the first slot wall 186 and the second slot wall 187 respectively include planar surface portions at the receiving head 181, and the first slot sidewall 186 and the second slot sidewall 187 respectively include planar surface portions at the receiving tail 183. As shown in FIG. 5, a projection of the receiving head 181 in the YZ plane has a substantially rectangular shape, a projection of the receiving tail 183 in the YZ plane also has a substantially rectangular shape, and a projection of the positioning portion 182 in the YZ plane has a drum shape. For example, the two circular arc surface portions of the first and second slot walls 186, 187 at the positioning portion 182 have a common circular center or spherical center, as indicated by O in FIG. 5. A projection of the two circular arc surface portions in the YZ plane is a segment of a circle (such as the circle indicated by the dashed line in FIG. 5) which has a circular center indicated by O and a radius indicated by R. The size (i.e., width) of the positioning portion 182 in the Y direction may be expressed as 2R. The size (i.e., width) of the receiving head 181 in the Y direction is equal to a side length of the rectangular shape, and is denoted as W1. The size (i.e., width) of the receiving tail 183 in the Y direction is equal to a side length of the rectangular shape, and is denoted as W2. As described above, the size (i.e., width) of the positioning portion 182 in the Y direction is greater than the size (i.e., width) of each of the receiving head 181 and the receiving tail 183 in the Y direction, that is, 2R>W1 and 2R>W2. Optionally, the size (i.e., width) W1 of the receiving head 181 in the Y direction may be equal to the size (i.e., width) of the receiving tail 183 in the Y direction, that is, W1=W2.

Optionally, the size (i.e., width) W1 of the receiving head 181 in the Y direction may be smaller than the size (i.e., width) of the receiving tail 183 in the Y direction, that is, W1<W2.

As described above, in a process of manufacturing the back plate, the side plates are typically formed by a bending process in order to improve processing efficiency. In order to avoid interference during the bending process, process notches need to be designed at the four corners of the back plate. FIG. 4 schematically illustrates a process notch at the first corner 16A. It should be understood that the same process notch may be also provided at the other three corners 16B, 16C, and 16D, respectively.

Referring to FIG. 4, the back plate 1 further includes a notch 19 at the first corner 16A. For convenience of description, a portion of the side plates of the back plate 1 at the first corner 16A is referred to as a connection portion 20. The notch 19 is in a positional correspondence with the connection portion 20. A projection of the notch 19 on the XY plane (i.e., in the Z direction) coincides with a projection of the connection portion 20 on the XY plane (i.e., in the Z direction). The notch 19 is located on a side of the side plates 11, 12 distal to the bottom plate 15. Optionally, a size (i.e., height) of the notch 19 in the Z direction is smaller than a size (i.e., height) of the receiving slots 17, 18 in the Z direction, and accordingly, a size (i.e., height) of the connection portion 20 in the Z direction is greater than the height h.

Figure 6A:
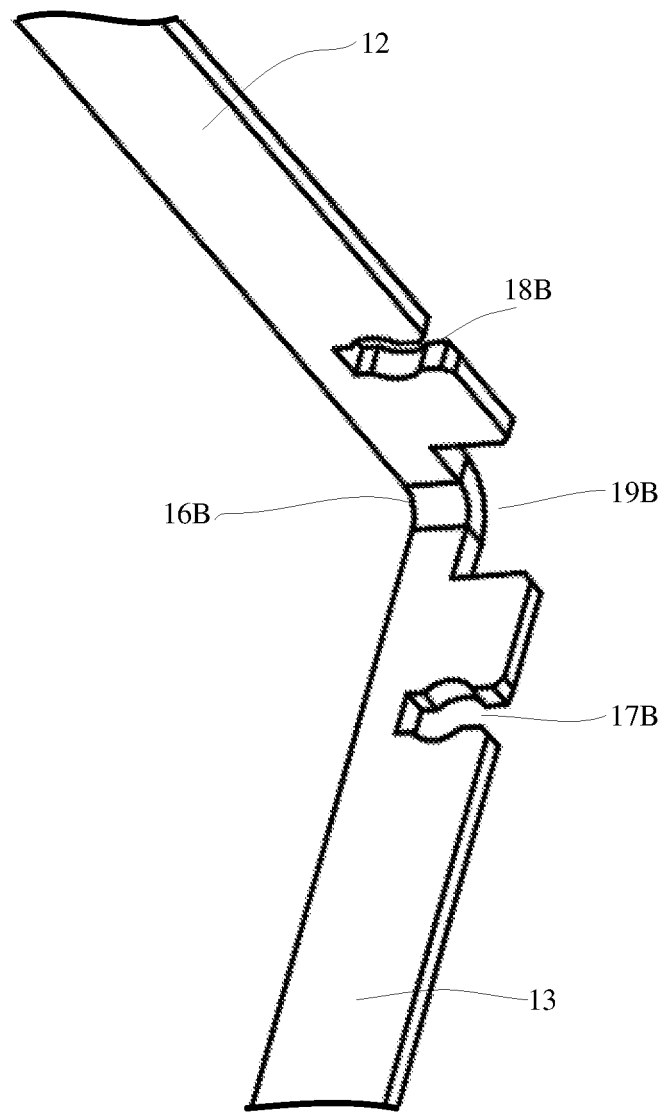
FIG. 6A to FIG. 6C are partial enlarged views showing structures of the back plate shown in FIG. 3 at other three corners, respectively.
Figure 6B:
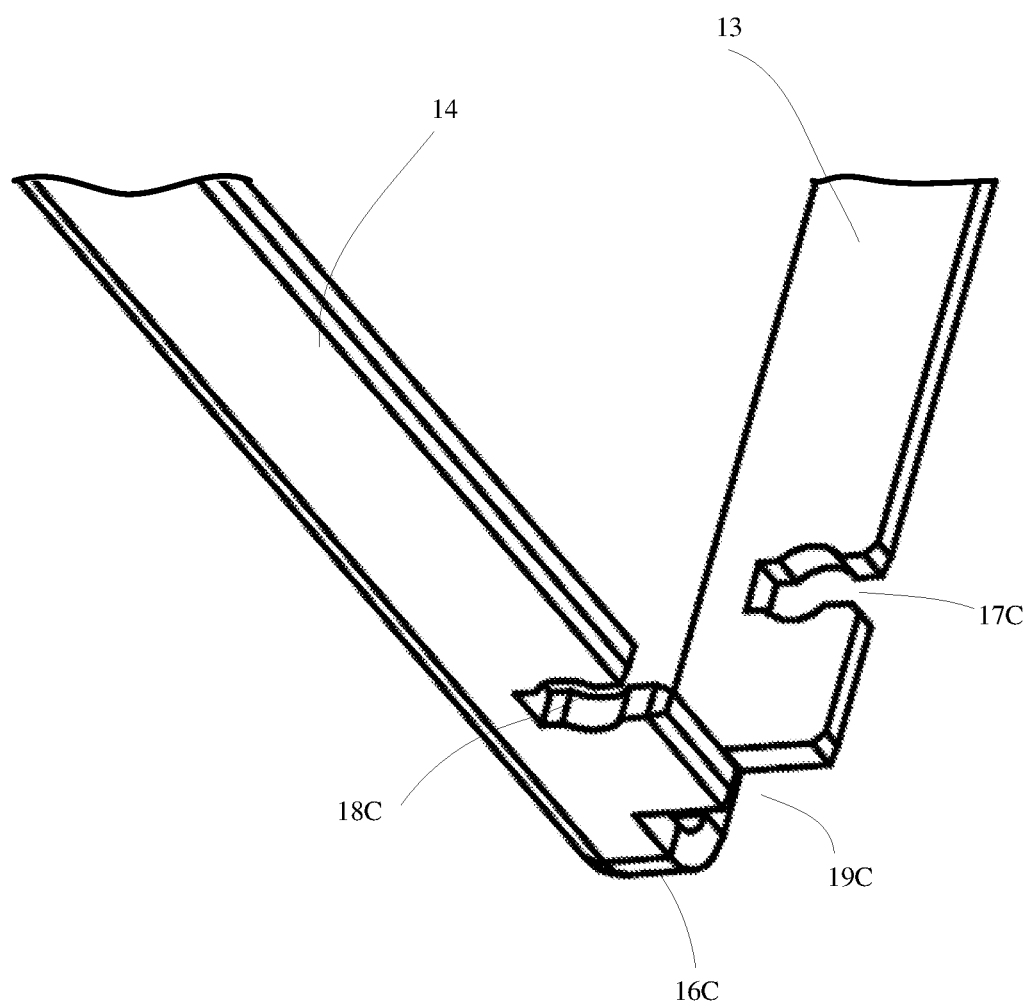
Figure 6C:
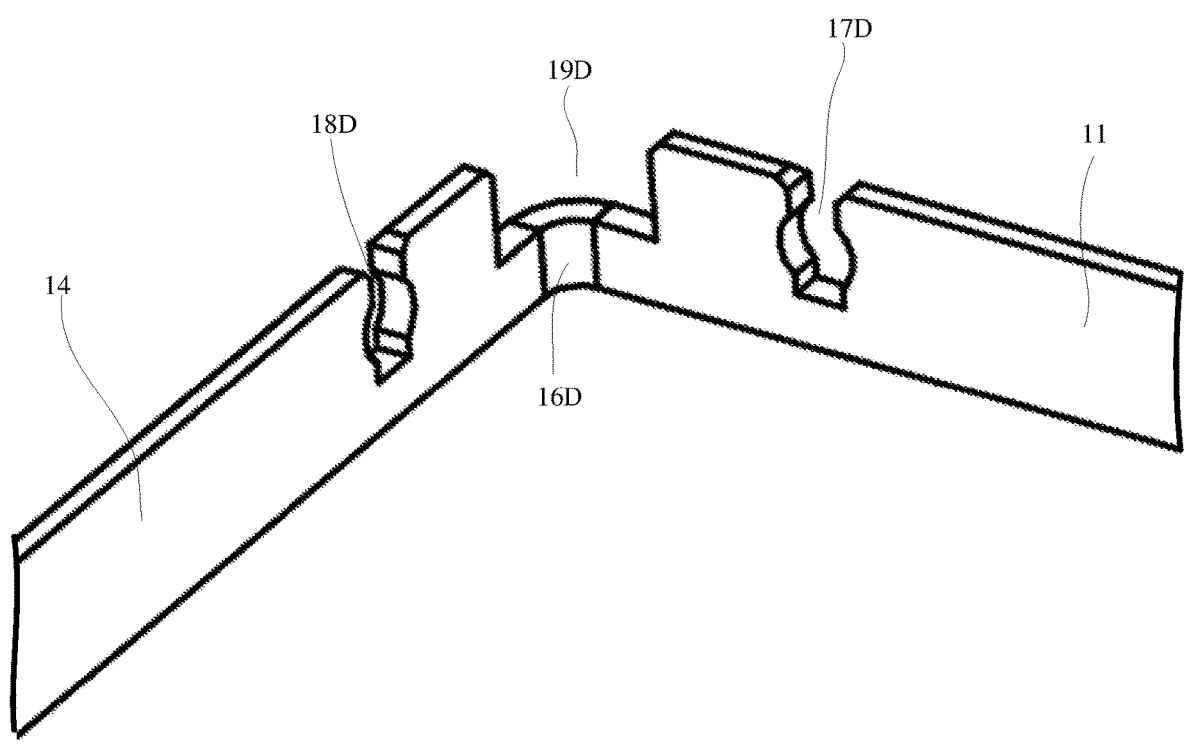

Optionally, the back plate 1 may have the same structure at the other three corners 16B, 16C, and 16D as at the corner 16A. Referring to FIGS. 6A to 6C, partial enlarged views of the back plate shown in FIG. 3 at the other three corners 16B, 16C, and 16D are shown, respectively. As shown in FIG. 6A, the back plate 1 may further include a third receiving slot 17B, a fourth receiving slot 18B, and a notch 19B which are disposed adjacent to the second corner 16B. The third receiving slot 17B is disposed in the third side plate 13, and its structure and shape are consistent with the structure and shape of the first receiving slot 17, and they may refer to the above descriptions of the first receiving slot 17. The fourth receiving slot 18B is disposed in the second side plate 12, and its structure and shape are consistent with the structure and shape of the second receiving slot 18, and they may refer to the above descriptions of the second receiving slot 18. The structure and shape of the notch 19B are consistent with the structure and shape of the notch 19, and they may refer to the above descriptions of the notch 19. As shown in FIG. 6B, the back plate 1 may further include a fifth receiving slot 17C, a sixth receiving slot 18C, and a notch 19C which are disposed adjacent to the third corner 16C. The fifth receiving slot 17C is disposed in the third side plate 13, and its structure and shape are consistent with the structure and shape of the first receiving slot 17, and they may refer to the above descriptions of the first receiving slot 17. The sixth receiving slot 18C is disposed in the fourth side plate 14. The structure and shape of the sixth receiving slot 18C are consistent with the structure and shape of the second receiving slot 18, and they may refer to the above descriptions of the second receiving slot 18. The structure and shape of the notch 19C are consistent with the structure and shape of the notch 19, and they may refer to the above descriptions of the notch 19. As shown in FIG. 6C, the back plate 1 may further include a seventh receiving slot 17D, an eighth receiving slot 18D, and a notch 19D which are disposed adjacent to the fourth corner 16D. The seventh receiving slot 17D is disposed in the first side plate 11, and its structure and shape are consistent with the structure and shape of the first receiving slot 17, and they may refer to the above descriptions of the first receiving slot 17. The eighth receiving slot 18D is disposed in the fourth side plate 14. The structure and shape of the eighth receiving slot 18D are consistent with the structure and shape of the second receiving slot 18, and they may refer to the above descriptions of the second receiving slot 18. The structure and shape of the notch 19D are consistent with the structure and shape of the notch 19, and they may refer to the above descriptions of the notch 19.

Figure 7:
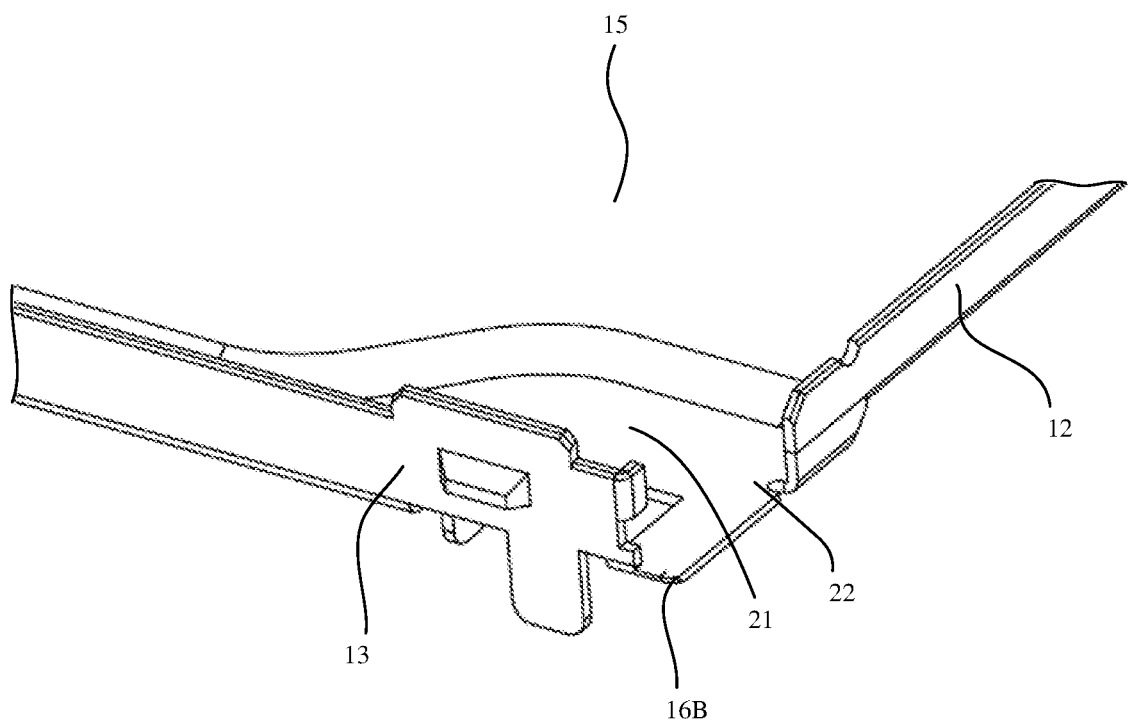
FIG. 7 is a partial enlarged view of the back plate according to some embodiments of the present disclosure, at a second corner.

Optionally, the back plate 1 may have a different structure at the corner 16B from at the corner 16A. FIG. 7 is a partial enlarged view of a back plate according to some embodiments of the present disclosure at the second corner 16B. With reference to FIG. 3 and FIG. 7, the back plate 1 may include a sink 21 and a notch 22 located at the second corner 16B. The sink 21 is formed in the bottom plate 15 so that a dimension (i.e., thickness) of a portion of the bottom plate 15 at the sink 21 in the Z direction is smaller than a dimension (i.e., thickness) of the other portion of the bottom plate 15 in the Z direction at a position excluding the sink 21. The sink 21 is in communication with the notch 22. In the embodiment shown in FIG. 7, the notch 22 is provided in the second side plate 12.

Figure 8:
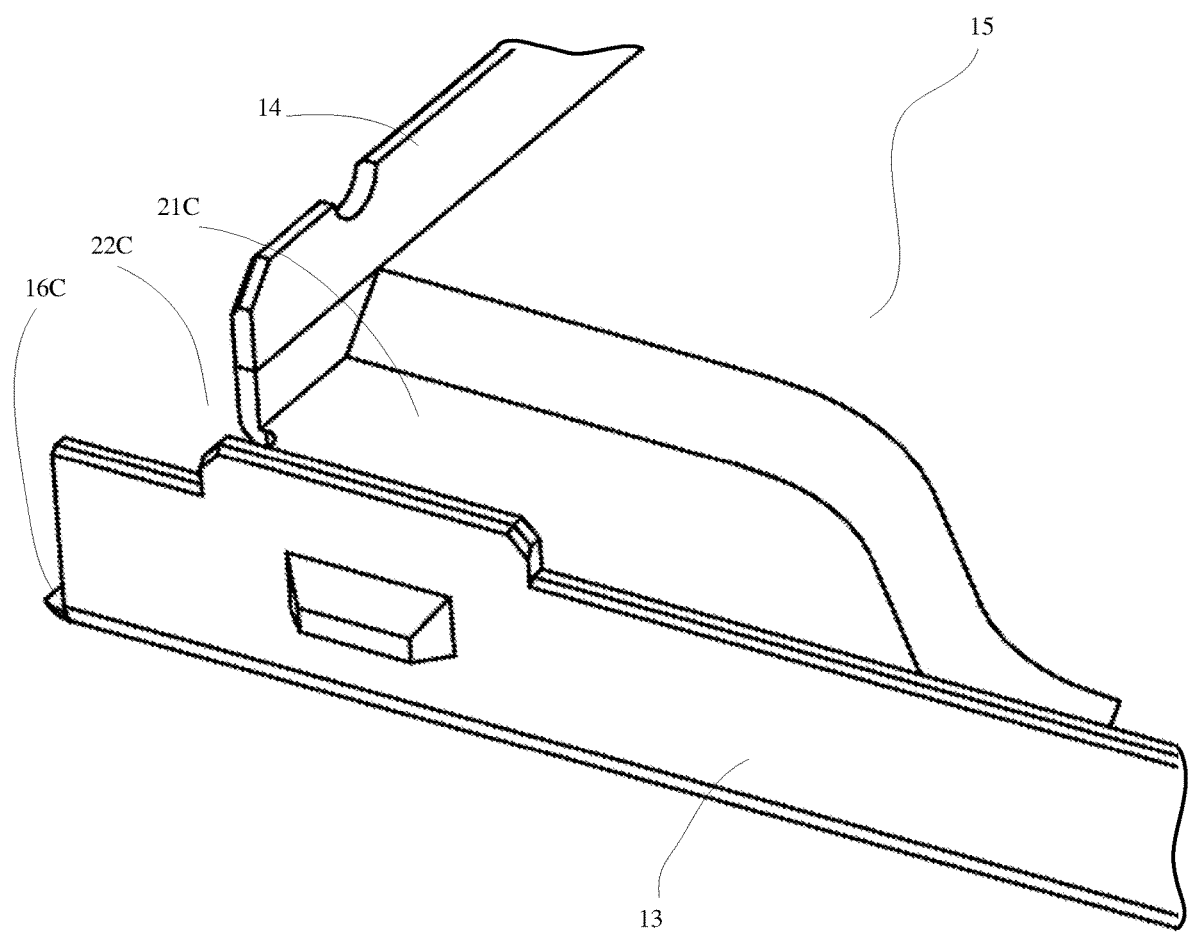
FIG. 8 is a partial enlarged view of the back plate according to some embodiments of the present disclosure, at a third corner.

Optionally, the back plate 1 may have the same structure at the corner 16C as at the corner 16B. FIG. 8 is a partial enlarged view of a back plate according to some embodiments of the present disclosure at the third corner 16C. With reference to FIG. 3 and FIG. 8, the back plate 1 may include a sink 21C and a notch 22C at the third corner 16C. The sink 21C is formed in the bottom plate 15 so that the dimension (i.e., thickness) of a portion of the bottom plate 15 at the sink 21C in the Z direction is smaller than a dimension (i.e., thickness) of the other portion of the bottom plate 15 in the Z direction at a position excluding the sink 21C. The sink 21C is in communication with the notch 22C. In the embodiment shown in FIG. 8, the notch 22C is provided in the fourth side plate 14.

For example, the back plate 1 according to the embodiments of the present disclosure may have the structure including the receiving slot at two corners (i.e., the first corner 16A and the fourth corner 16D) located on the sky side. Specifically, the structure shown in FIG. 4 is provided at the first corner 16A, and the structure shown in FIG. 6C is provided at the fourth corner 16D. The structure including the sink may be provided at two corners (i.e., the second corner 16B and the third corner 16C) on the ground side. Specifically, the structure shown in FIG. 7 is provided at the second corner 16B, and the structure shown in FIG. 8 is provided at the third corner 16C.

Figure 9:
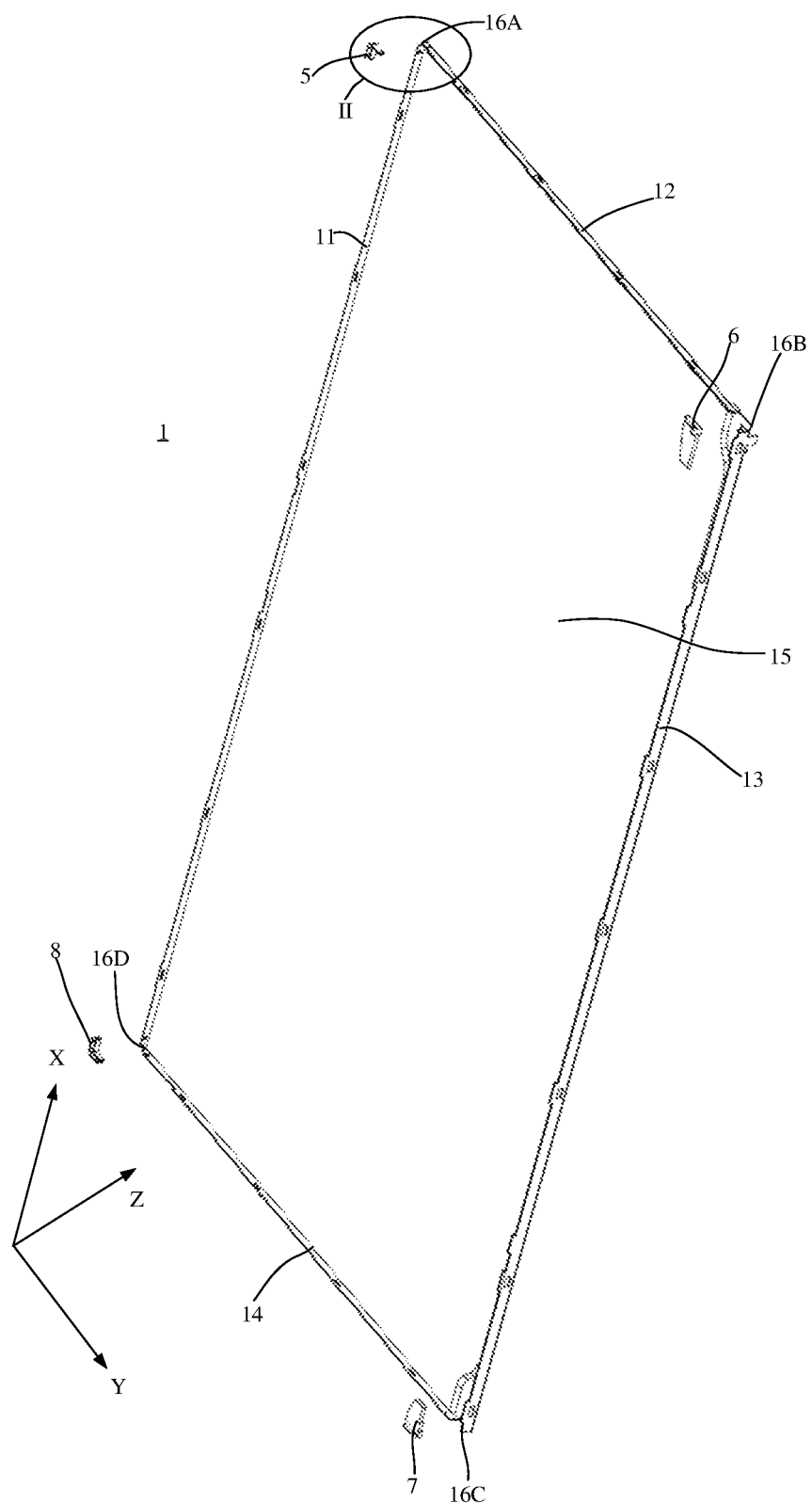
FIG. 9 is an exploded perspective view of a back plate assembly according to some embodiments of the present disclosure.

FIG. 9 is an exploded perspective view of a back plate assembly according to some embodiments of the present disclosure. Referring to FIG. 9, the back plate assembly may include a back plate 1 and a buffer member. The back plate 1 is a back plate described according to any one of the foregoing embodiments. For details, reference may be made to the descriptions in the foregoing embodiments, and details are not described herein again. The buffer member is located at the junction between two adjacent side plates, that is, at the corner of the back plate 1. For example, the buffer member may include a first buffer member 5 at the first corner 16A, a second buffer member 6 at the second corner 16B, a third buffer member 7 at the third corner 16C, and a fourth buffer member 8 at the fourth corner 16D.

Figure 10:
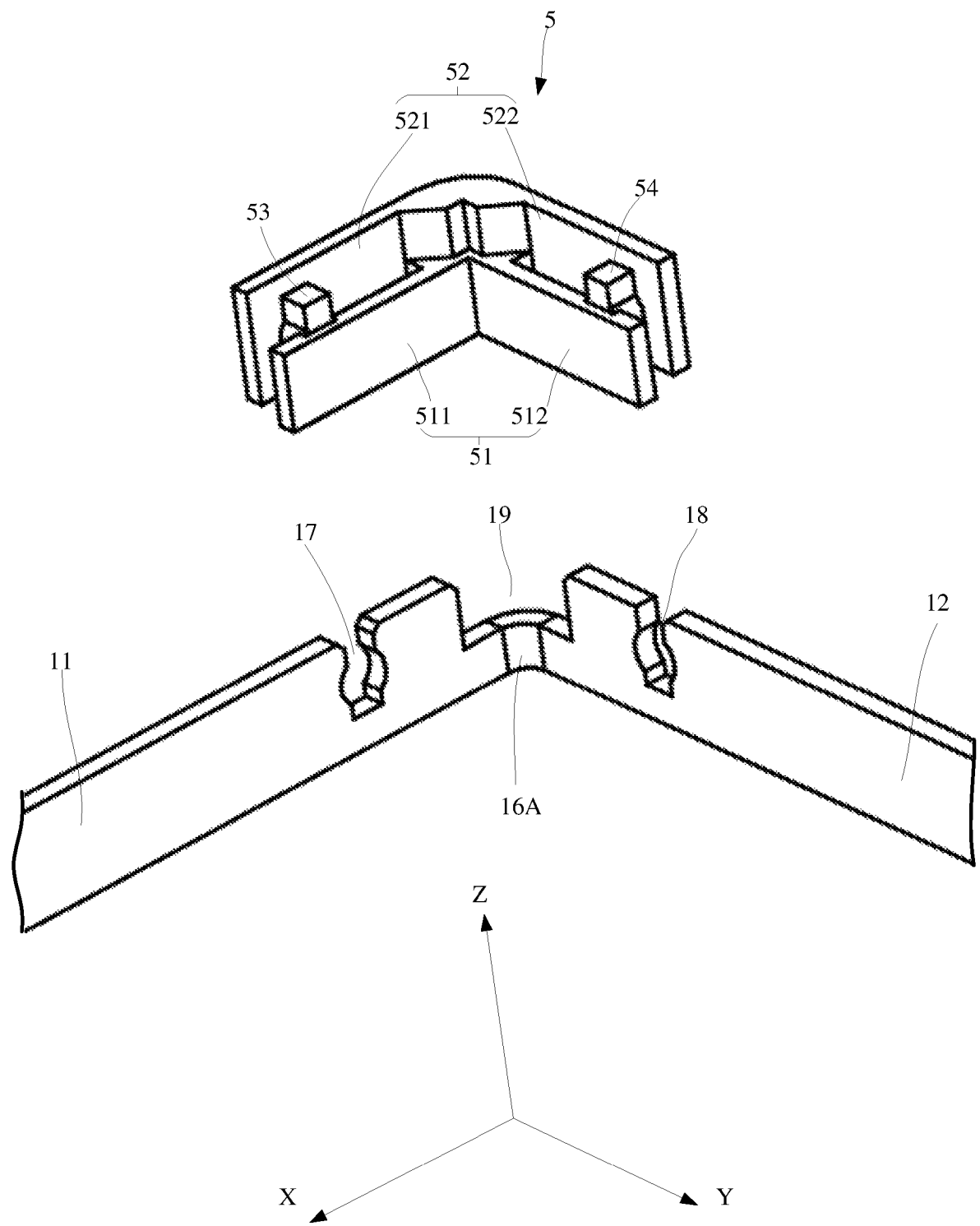
FIG. 10 is a partial enlarged view of part II of the back plate assembly shown in FIG. 9.

FIG. 10 is a partially enlarged view of a part II of the back plate assembly shown in FIG. 9. For example, the part II is a part where the first corner 16A (located at the junction between the first side plate 11 and the second side plate 12)

is located. Referring to FIG. 10, the back plate 1 may include the first receiving slot 17 in the first side plate 11, the second receiving slot 18 in the second side plate 12 and the notch 19 at the first corner 16A, and specific structures thereof may refer to the above descriptions for FIG. 3.

Figure 11:
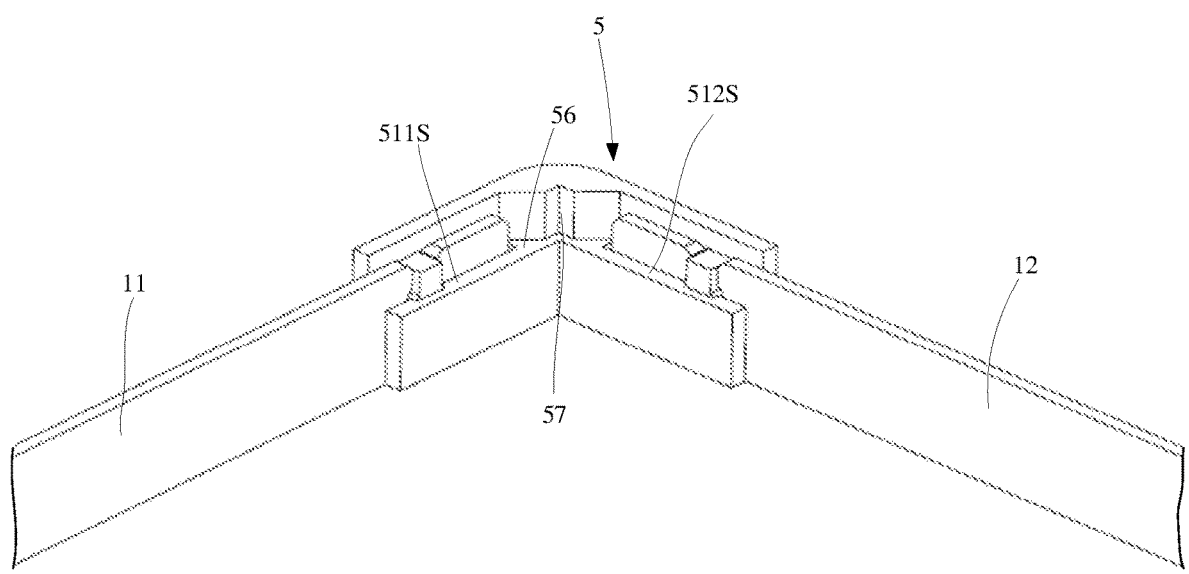
FIG. 11 is a partial enlarged view of the part II of the back plate assembly according to some embodiments of the present disclosure, in an assembled state.

FIG. 11 is a partial enlarged view of the part II of the back plate assembly according to some embodiments of the present disclosure, which is in an assembled state. With reference to FIG. 10 and FIG. 11, the first buffer member 5 at the first corner 16A is adapted to be inserted into the first receiving slot 17 and the second receiving slot 18 of the back plate 1 so as to be positioned and fixed on the back plate 1.

Figure 12:
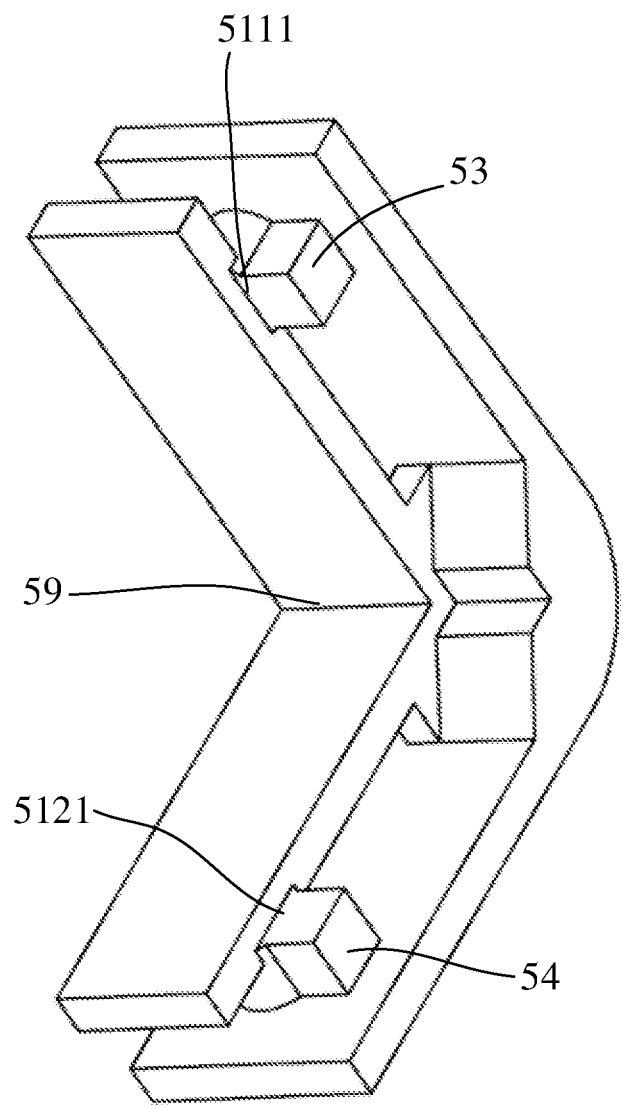
FIG. 12 is a perspective view of a buffer member of a back plate assembly according to some embodiments of the present disclosure, from another perspective.
Figure 13:
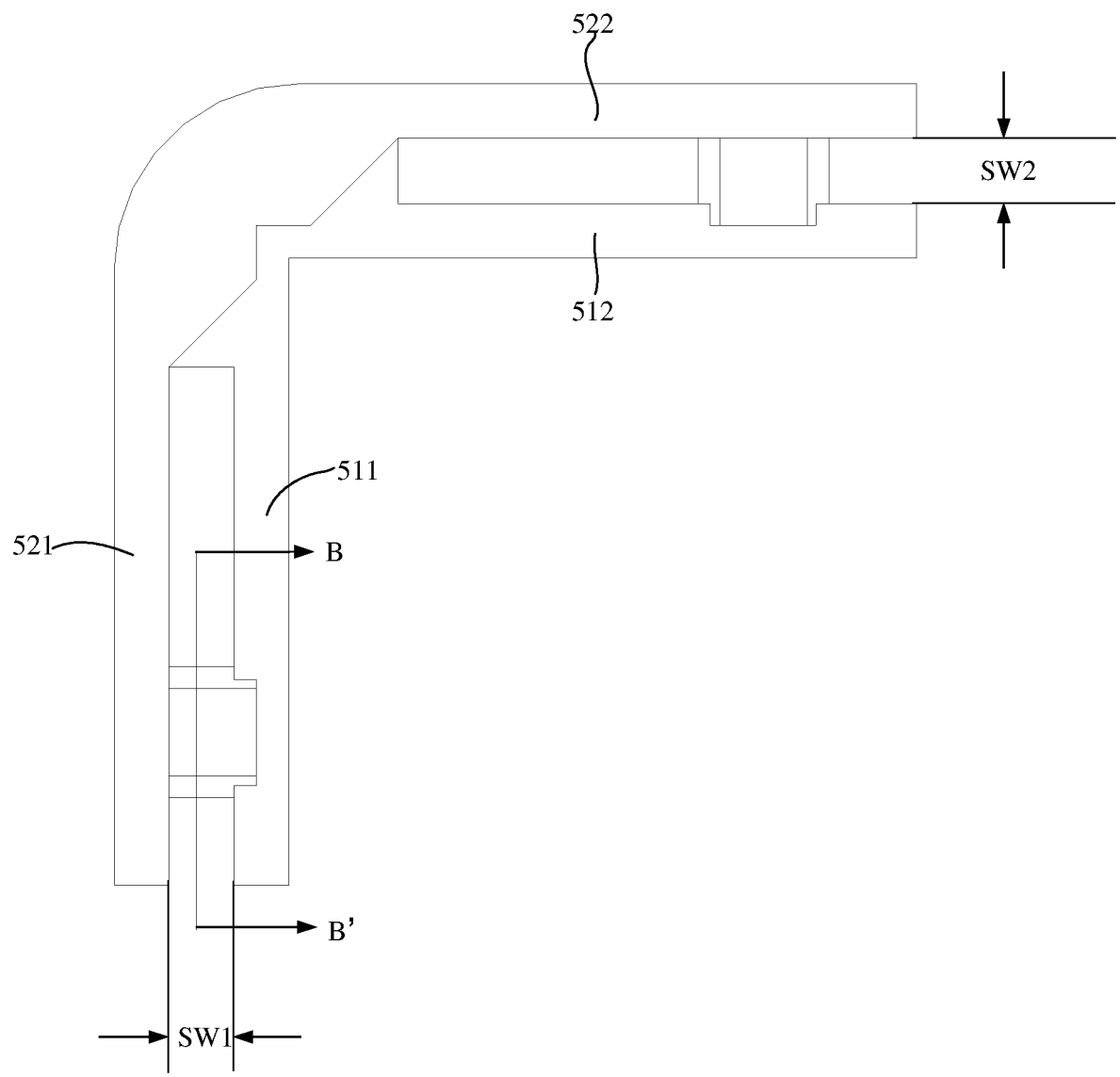
FIG. 13 is a plan view of a buffer member of a back plate assembly according to some embodiments of the present disclosure.
Figure 14:
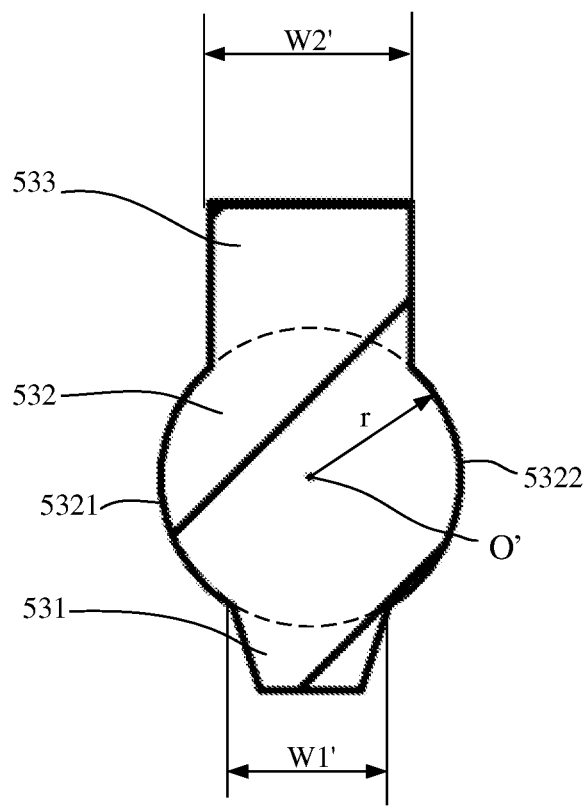
FIG. 14 is a cross-sectional view, which is taken along line BB' in FIG. 13, of the buffer member of the back plate assembly according to some embodiments of the present disclosure.

FIG. 12 is a perspective view of the buffer member of the back plate assembly according to some embodiments of the present disclosure from another perspective, FIG. 13 is a plan view of the buffer member of the back plate assembly according to some embodiments of the present disclosure, and FIG. 14 is a cross-sectional view, which is taken along line BB' in FIG. 13, of the buffer member of the back plate assembly according to some embodiments of the present disclosure.

With reference to FIGS. 10 to 14, the first buffer member 5 includes a first body 51 and a second body 52. The first body 51 is located on an inner side, that is, on a side of the side plate facing the accommodation space 1S. The second body 52 is located on an outer side, that is, on a side of the side plate facing away from the accommodation space. The first body 51 includes a first arm 511 and a second arm 512, and the second body 52 includes a third arm 521 and a fourth arm 522. The first arm 511 and the third arm 521 extend in the X direction, that is, are parallel to the first side plate 11. The second arm 512 and the fourth arm 522 extend in the Y direction, that is, are parallel to the second side plate 12.

The first arm 511 and the third arm 521 are spaced apart from each other in the Y direction, and the second arm 512 and the fourth arm 522 are spaced apart from each other in the X direction. As shown in FIG. 13, a distance between the first arm 511 and the third arm 521 in the Y direction is labeled as SW1, and the distance SW1 may be substantially equal to the size (i.e., thickness) of the first side plate 11 in the Y direction. A distance between the second arm 512 and the fourth arm 522 in the X direction is labeled as SW2, and the distance SW2 may be substantially equal to the size (i.e., thickness) of the second side plate 12 in the X direction. With this design, when the first buffer member 5 is inserted into the first receiving slot 17 and the second receiving slot 18, the first side plate 11 is sandwiched between the first arm 511 and the third arm 521, and the second side plate 12 is sandwiched between the second arm 512 and the fourth arm 522.

The first buffer member 5 includes a corner portion 59. The first arm 511 and the second arm 512 are connected at the corner portion 59. For example, the first arm 511 and the second arm 512 are connected substantially perpendicularly at the corner portion 59, so that the first body 51 has a substantially L shape. The third arm 521 and the fourth arm 522 are connected at the corner portion 59. For example, the third arm 521 and the fourth arm 522 are connected substantially perpendicularly at the corner portion 59, so that the second body 52 also has a substantially L shape.

The first buffer member 5 further includes an insertion portion which is adapted to be inserted into the receiving slot of the back plate 1.

For example, the insertion portion may include a first insertion portion 53 and a second insertion portion 54. The first insertion portion 53 is disposed between the first arm 511 and the third arm 521, and the second insertion portion 54 is disposed between the second arm 512 and the fourth arm 522. The first insertion portion 53 is adapted to be inserted into the first receiving slot 17, and the second insertion portion 54 is adapted to be inserted into the second receiving slot 18.

For example, the first insertion portion 53 may include three parts which include an insertion head 531, a positioning part 532, and an insertion tail 533. A size (i.e., width) of the positioning part 532 in the X direction is greater than a size (i.e., width) of each of the insertion head 531 and the insertion tail 533 in the X direction. Shapes and sizes of the insertion head 531, the positioning part 532, and the insertion tail 533 of the first insertion portion 53 may be adapted to shapes and sizes of the receiving head 171, the positioning portion 172, and the receiving tail 173 of the first receiving slot 17, respectively.

Figure 17:
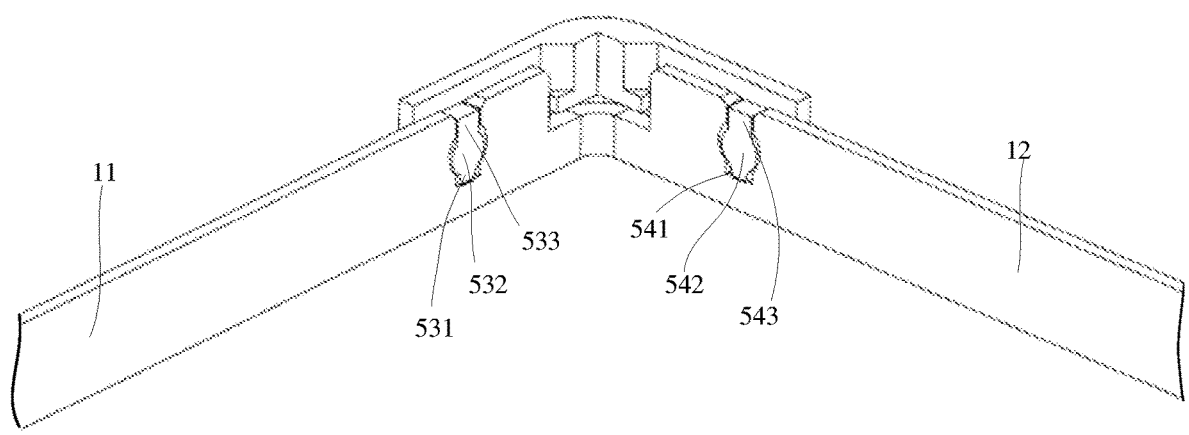
FIG. 17 is a perspective view of the back plate assembly, in an assembled state, according to some embodiments of the present disclosure, wherein a body of a buffer member on the inner side is removed to clearly show a fitting relationship between the buffer member and a receiving slot.

FIG. 17 is a perspective view of the back plate assembly, which is in an assembled state, according to some embodiments of the present disclosure, in which the body of the buffer member on the inner side is removed to clearly show a fitting relationship between the buffer member and the receiving slot. Referring to FIG. 14 and FIG. 17, after the first insertion portion 53 is inserted into the first receiving slot 17, the insertion head 531 is received by the receiving head 171, that is, the insertion head 531 abuts against the receiving head 171; the positioning part 532 is received by the positioning portion 172, that is, the positioning part 532 abuts against the positioning portion 172; and the insertion tail 533 is received by the receiving tail 173, that is, the insertion tail 533 abuts against the receiving tail 173.

Figure 18:
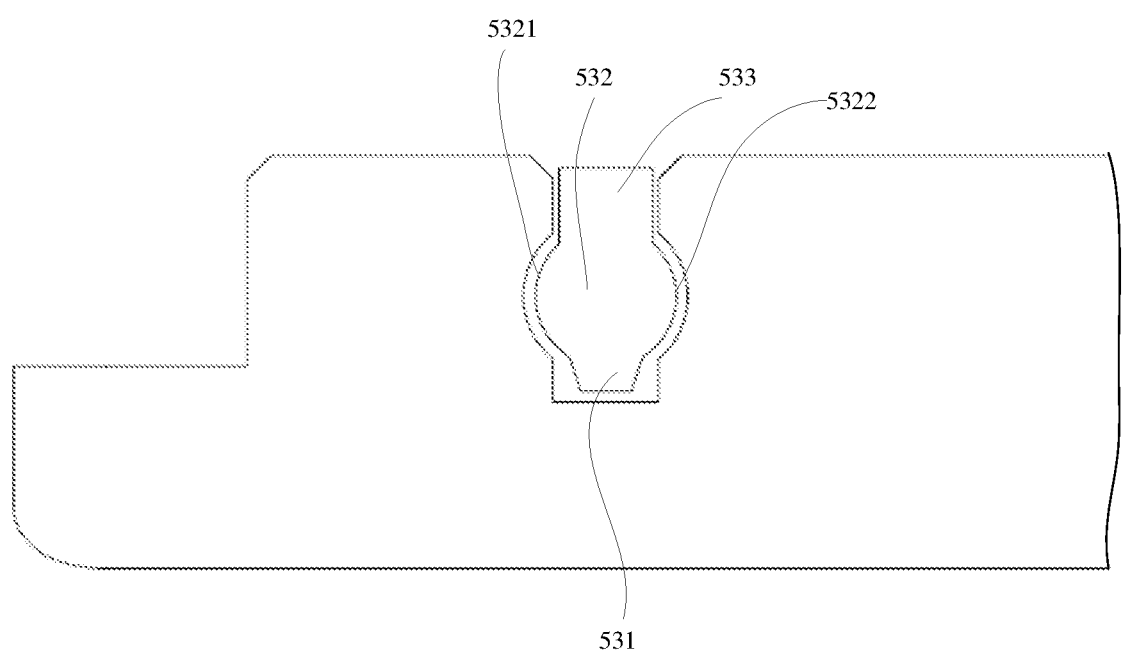
FIG. 18 is a schematic view of the back plate assembly shown in FIG. 11, which is in a process of inserting the buffer member into the receiving slot, wherein the body of the buffer member located on the outer side is removed to clearly show a fitting relationship between an insertion portion of the buffer member and the receiving slot in a process of inserting the insertion portion of the buffer member into the receiving slot.

FIG. 18 is a schematic view of the back plate assembly shown in FIG. 11, which is in a process of inserting the buffer member into the receiving slot, wherein the body of the buffer member located on the outer side is removed to clearly show a fitting relationship between the insertion portion of the buffer member and the receiving slot when the insertion portion is being inserted the receiving slot.

With reference to FIGS. 11 to 14, FIG. 17 and FIG. 18, the positioning part 532 includes two circular arc surface parts 5321, 5322. As shown in FIG. 14, a projection of the insertion head 531 in the XZ plane has an inverted trapezoid shape, a projection of the insertion tail 533 in the XZ plane has a substantially rectangular shape, and a projection of the positioning part 532 in the XZ plane has a drum shape. For example, the two circular arc surface parts 5321, 5322 of the positioning part 532 have a common spherical center, as indicated by O' in FIG. 14. Projections of the two circular arc surface parts 5321, 5322 in the XZ plane are respectively a segment of a circle (such as a circle indicated by a dashed line in FIG. 14) which has a circular center indicated by O' and a radius indicated by r. The size (i.e., width) of the positioning part 532 in the X direction may be expressed as 2r. A maximum size (i.e., maximum width) of the insertion head 531 in the X direction is equal to a side length of a long bottom side of the trapezoid, and is denoted as W1'. The size (i.e., width) of the insertion tail 533 in the X direction is equal to a side length of the rectangle, and is denoted as W2'. As described above, the size (i.e., width) of the positioning part 532 in the X direction is greater than the size (i.e., width) of each of the insertion head 531 and the insertion tail 533 in the X direction, that is, 2r>W1' and 2r>W2'. Optionally, the maximum size (i.e., maximum width) W1' of the insertion head 531 in the X direction may be equal to the size (i.e., width) W2' of the insertion tail 533 in the X direction, that is, W1'=W2'. Alternatively, the maximum size (i.e., maximum width) W1' of the insertion head 531 in the X direction may be smaller than the size (i.e., width) W2' of the insertion tail 533 in the X direction, that is, W1'<W2'.

With reference to FIG. 5 and FIG. 14, the maximum size (i.e., maximum width) W1' of the insertion head 531 in the X direction may be smaller than or substantially equal to the size (i.e., width) W1 of the receiving head 171 in the X direction, the diameter 2r of the positioning part 532 may be smaller than or substantially equal to the diameter 2R of the positioning portion 172, and the size (i.e., width) W2' of the insertion tail 533 in the X direction may be smaller than or substantially equal to the size (i.e., width) W2 of the receiving tail 173 in the X direction. With such a size design, the first insertion portion 53 may be positioned in the first receiving slot 17.

For example, the diameter 2r of the positioning part 532 may be greater than the size (i.e., width) W1 of the receiving head 171 in the X direction and the size (i.e., width) W2 of the receiving tail 173 in the X direction. In this way, after the first insertion portion 53 is completely inserted into the first receiving slot 17, it may ensure that the positioning part 532 is clamped on the positioning portion 172, that is, the first insertion portion 53 does not disengage from the first receiving slot 17, thereby realizing that the first insertion portion 53 is positioned and fixed in the first receiving slot 17.

For example, the first buffer member 5 may be made of an elastic material such as rubber, silicone or the like. The first buffer member 5 may be made by an integrated molding process such as injection molding. That is, the first insertion portion 53 is also made of an elastic material such as rubber, silicone or the like. In this way, during the first insertion portion 53 is inserted into the first receiving slot 17, the first buffer member 5 is pressed into the first receiving slot 17 under a pressing action. The positioning part 532 is compressed under the pressing action. In this way, the positioning part 532 may pass through the receiving tail 173 of the first receiving slot 17 to enter the positioning portion 172 of the first receiving slot 17. Then, the positioning part 532 may be restored to its original state to be clamped on the positioning portion 172. For example, FIG. 18 schematically illustrates a state in which the first buffer member 5 is being pressed and the first buffer member 5 is being restored to its original state.

In the embodiments of the present disclosure, a difference (i.e., 2r−W2) between the diameter 2r of the positioning part 532 and the size (i.e., width) W2 of the receiving tail 173 in the X direction is related to the material of the first buffer member 5, specifically, is related to elastic properties (such as the modulus of elasticity) of the material. The difference (i.e., 2r−W2) between the diameter 2r of the positioning part 532 and the size (i.e., width) W2 of the receiving tail 173 in the X direction is designed so that the positioning part 532 may be compressed under the pressing action to pass through the receiving tail 173.

As shown in FIG. 14, the projection of the insertion head 531 in the XZ plane has an inverted trapezoidal shape to facilitate the insertion of the first insertion portion 53 into the first receiving slot 17.

Referring back to FIG. 11 and FIG. 17, for example, the second insertion portion 54 may also include three parts which include an insertion head 541, a positioning part 542, and an insertion tail 543. A size (i.e., width) of the positioning part 542 in the Y direction is greater than a size (i.e., width) of each of the insertion head 541 and the insertion tail 543 in the Y direction. Shapes and sizes of the insertion head 541, the positioning part 542, and the insertion tail 543 of the second insertion portion 54 may be adapted to shapes and sizes of the receiving head 181, the positioning portion 182, and the receiving tail 183 of the second receiving slot 18, respectively. The structure and shape of the second insertion portion 54 are completely consistent with the structure and shape of the first insertion portion 53, except that orientations thereof are different. For details, reference may be made to the above descriptions of the first insertion portion 53, thus the details are not described herein again.

Referring back to FIG. 11, a size (i.e., height) of the first body 51 in the Z direction is smaller than a size (i.e., height) of the second body 52 in the Z direction. Specifically, a size (i.e., height) of the first arm 511 in the Z direction is equal to a size (i.e., height) of the second arm 512 in the Z direction, and a size (i.e., height) of the third arm 521 in the Z direction is equal to a size (i.e., height) of the fourth arm 522 in the Z direction. The size (i.e., height) of each of the first arm 511 and the second arm 512 in the Z direction is smaller than the size (i.e., height) of each of the third arm 521 and the fourth arm 522 in the Z direction.

As shown in FIG. 11, the first body 51 includes a surface (that is, top surface in the drawing) distal to the bottom plate 15 in the Z direction. Specifically, the first arm 511 includes a first top surface 511S which is distal to the bottom plate 15 in the Z direction, and the second arm 512 includes a second top surface 512S distal to the bottom plate 15 in the Z direction. The first top surface 511S and the second top surface 512S both extend to the second body 52, specifically, extend to the inner surface of the second body 52 facing the accommodation space 1S. In this way, the first buffer member 5 further includes a platform 56 located between the first body 51 and the second body 52. The platform 56 is located at the corner portion 59. The platform 56, the first top surface 511S, and the second top surface 512S are coplanar. The coplanar platform 56, first top surface 511S, and second top surface 512S form a support surface. For example, optical elements such as the light guide plate may be placed on the support surface, that is, the support surface functions to support the optical elements.

With continued reference to FIG. 11, the first buffer member 5 may further include an avoiding notch 57 located at the corner portion 59. The avoiding notch 57 is located on the inner surface of the second body 52 facing the accommodation space 1S, and extends from the platform 56 to a top surface (that is, surface distal to the bottom plate 15 in the Z direction) of the second body 52 in a direction distal to the bottom plate 15. In this way, when the optical elements such as the light guide plate rest on the support surface, a corner (typically having a right angle) of the light guide plate may be placed in the avoiding notch 57 to prevent the first buffer member from hitting the corner of the light guide plate, thereby avoiding damaging the optical elements such as the light guide plate.

With reference to FIGS. 11 to 13, a groove is formed on a side surface of the first body 51 facing the second body 52. Specifically, a first groove 5111 is formed in a side surface of the first arm 511 facing the third arm 521, and a second groove 5121 is formed in a side surface of the second arm 512 facing the fourth arm 522. At least a part of the first insertion portion 53 is received in the first groove 5111, and at least a part of the second insertion portion 54 is received in the second groove 5121.

Figure 15:
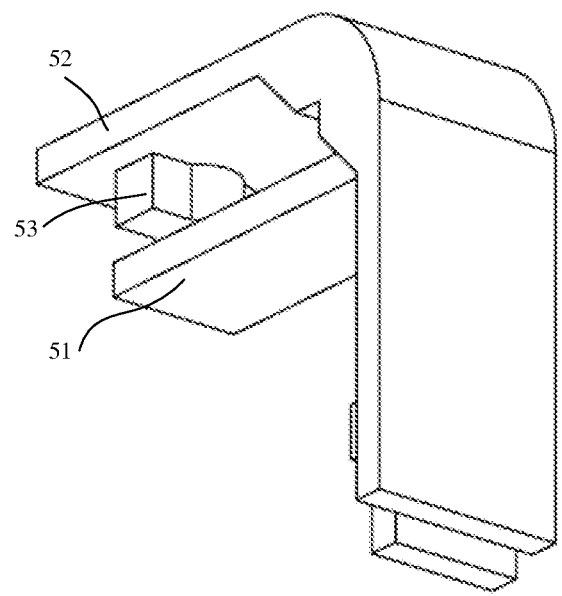
FIG. 15 is a perspective view of a buffer member according to other embodiments of the present disclosure.
Figure 16:
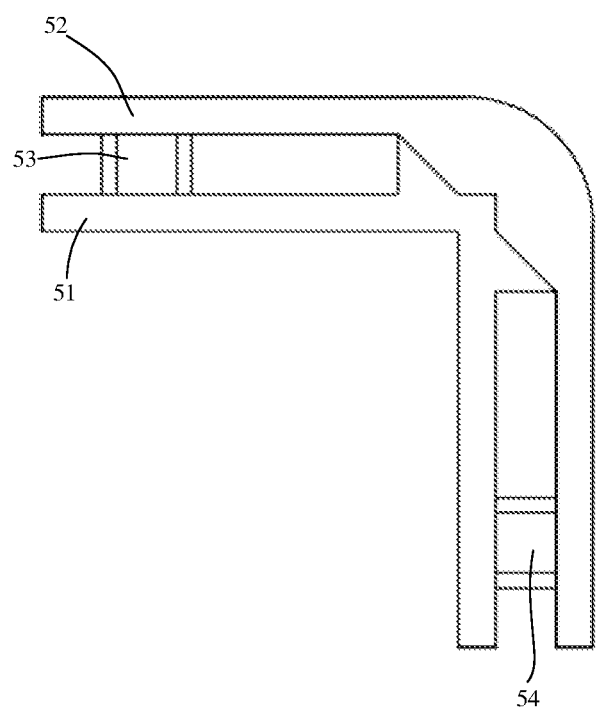
FIG. 16 is a plan view of the buffer member according to other embodiments of the present disclosure.

FIG. 15 is a perspective view of a buffer member according to other embodiments of the present disclosure, and FIG. 16 is a plan view of the buffer member according to other embodiments of the present disclosure. Referring to FIG. 15 and FIG. 16, the groove may not be formed in the side surface of the first body 51 facing the second body 52.

In the back plate assembly provided by the embodiments of the present disclosure, the first side plate of the back plate is sandwiched between the first arm and the third arm of the buffer member, so that the buffer member is positioned and fixed on the back plate in the Y direction; the second side plate of the back plate is sandwiched between the third arm and the fourth arm of the buffer member, so that the buffer member is positioned and fixed on the back plate in the X direction; the insertion portion of the buffer member is inserted into the receiving slot of the back plate, and specifically, the positioning part of the insertion portion is positioned and clamped on the positioning portion of the receiving slot, so that the buffer member is positioned and fixed on the back plate in the Z direction. In this way, the buffer member may be reliably positioned and fixed on the back plate.

In the embodiments of the present disclosure, the buffer member may be inserted into and positioned on the side plates of the back plate, and the buffer member is deformable by itself to be positioned, thereby avoiding using any double-sided adhesive tape and facilitating an assembly of the back plate assembly.

Figure 19A:
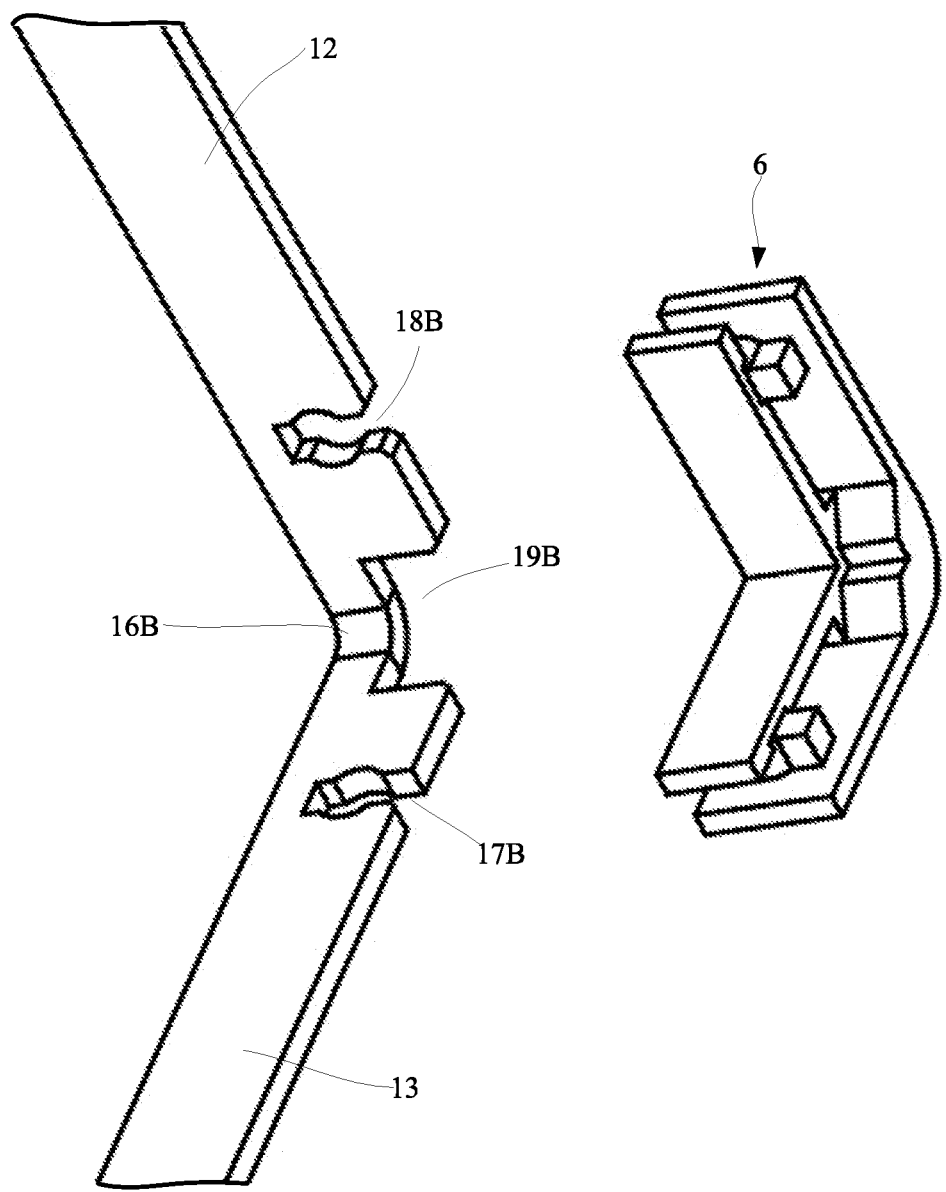
FIG. 19A to FIG. 19C are partial enlarged views showing structures of the back plate assembly according to some embodiments of the present disclosure at the other three corners, respectively.
Figure 19B:
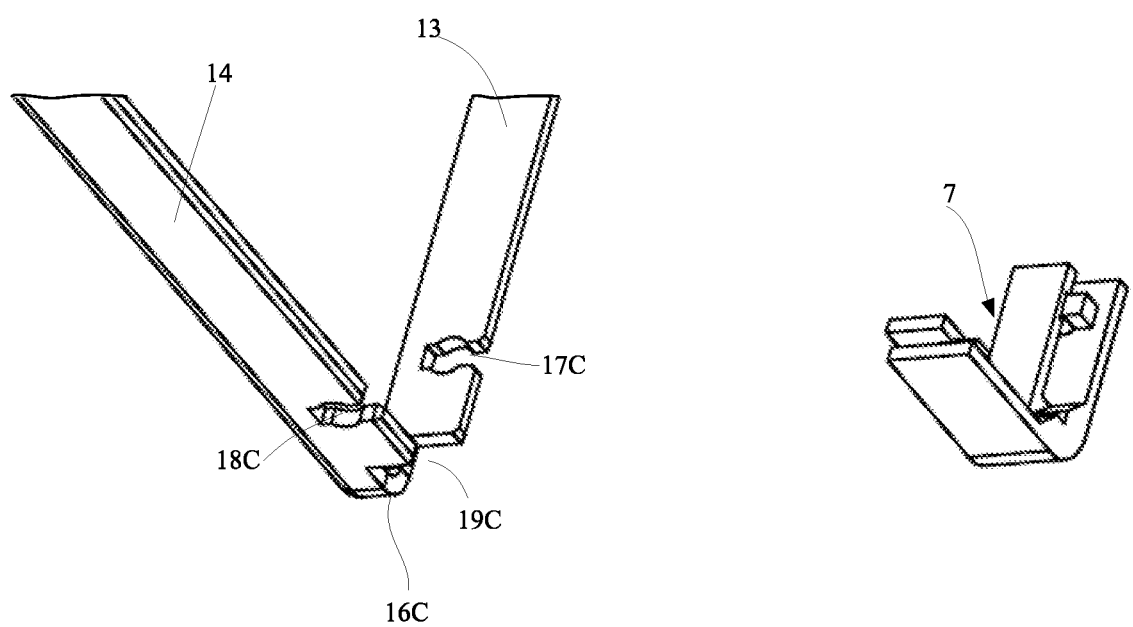
Figure 19C:
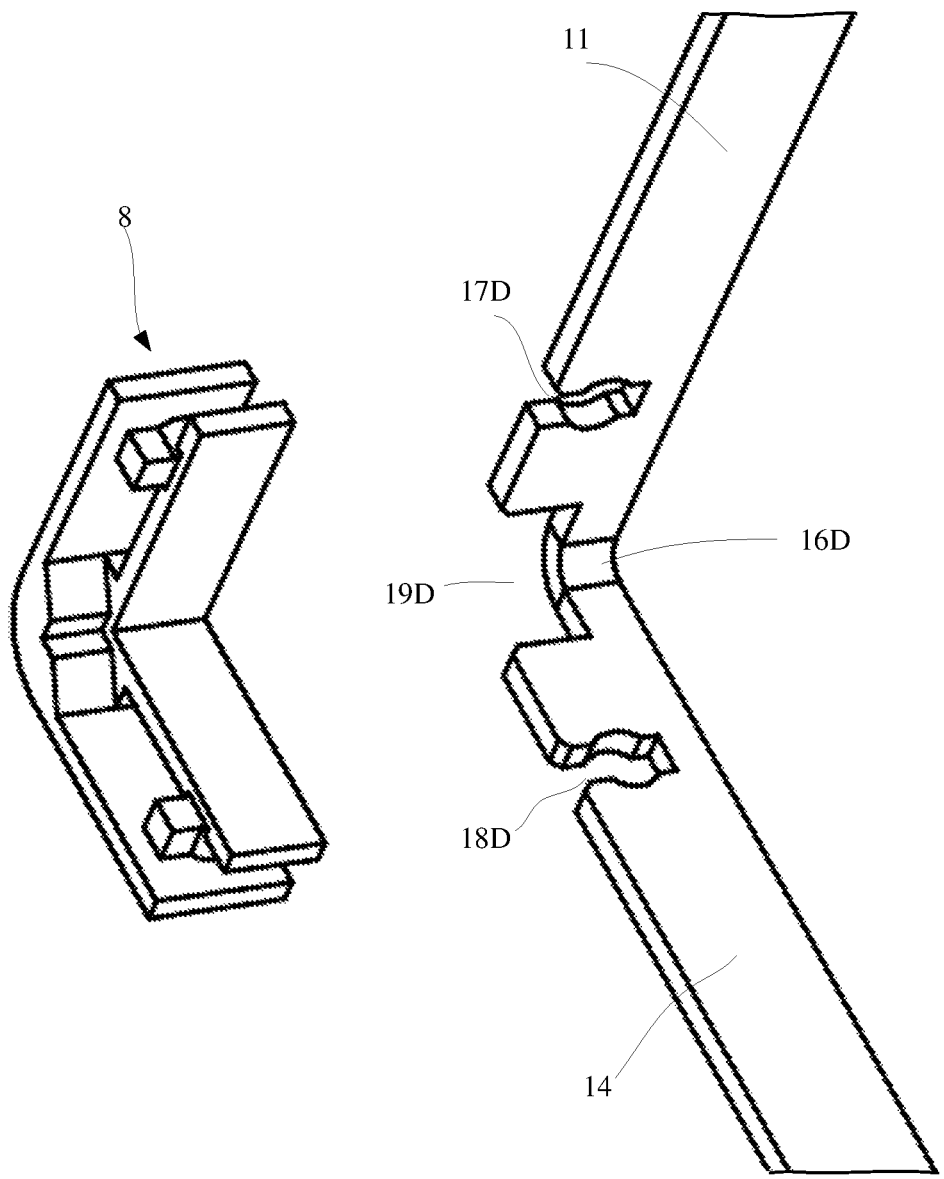

Optionally, the back plate assembly may have the same structure at the other three corners 16B, 16C, and 16D as at the corner 16A. Referring to FIGS. 19A to 19C, partial enlarged views of the back plate assembly according to embodiments of the present disclosure at the other three corners 16B, 16C, and 16D are shown, respectively. As shown in FIG. 19A, the back plate assembly may further include a third receiving slot 17B, a fourth receiving slot 18B, a notch 19B, and a second buffer member 6 which are disposed adjacent to the second corner 16B. The second buffer member 6 is adapted to be inserted into the third receiving slot 17B and the fourth receiving slot 18B of the back plate 1 so as to be positioned and fixed on the back plate 1. A structure of the second buffer member 6 is consistent with the structure of the first buffer member 5, and it may refer to the above descriptions of the first buffer member 5. As shown in FIG. 19B, the back plate assembly may further include a fifth receiving slot 17C, a sixth receiving slot 18C, a notch 19C, and a third buffer member 7 which are disposed adjacent to the third corner 16C. The third buffer member 7 is adapted to be inserted into the fifth receiving slot 17C and the sixth receiving slot 18C of the back plate 1 so as to be positioned and fixed on the back plate 1. A structure of the third buffer member 7 is consistent with the structure of the first buffer member 5, and it may refer to the above descriptions of the first buffer member 5. As shown in FIG. 19C, the back plate assembly may further include a seventh receiving slot 17D, an eighth receiving slot 18D, a notch 19D, and a fourth buffer member 8 which are disposed adjacent to the fourth corner 16D. The fourth buffer member 8 is adapted to be inserted into the seventh receiving slot 17D and the eighth receiving slot 18D of the back plate 1 so as to be positioned and fixed on the back plate 1. A structure of the fourth buffer member 8 is consistent with the structure of the first buffer member 5, and it may refer to the above descriptions of the first buffer member 5.

With reference to FIG. 11 and FIGS. 19A to 19C, when the four buffer members 5, 6, 7, 8 are respectively positioned and fixed on the back plate 1, the four buffer members 5, 6, 7, 8 respectively cover the notches 19, 19B, 19C, 19D to prevent leakage of light emitted from the optical elements located in the accommodation space 1S, thereby preventing light leakage.

Figure 20:
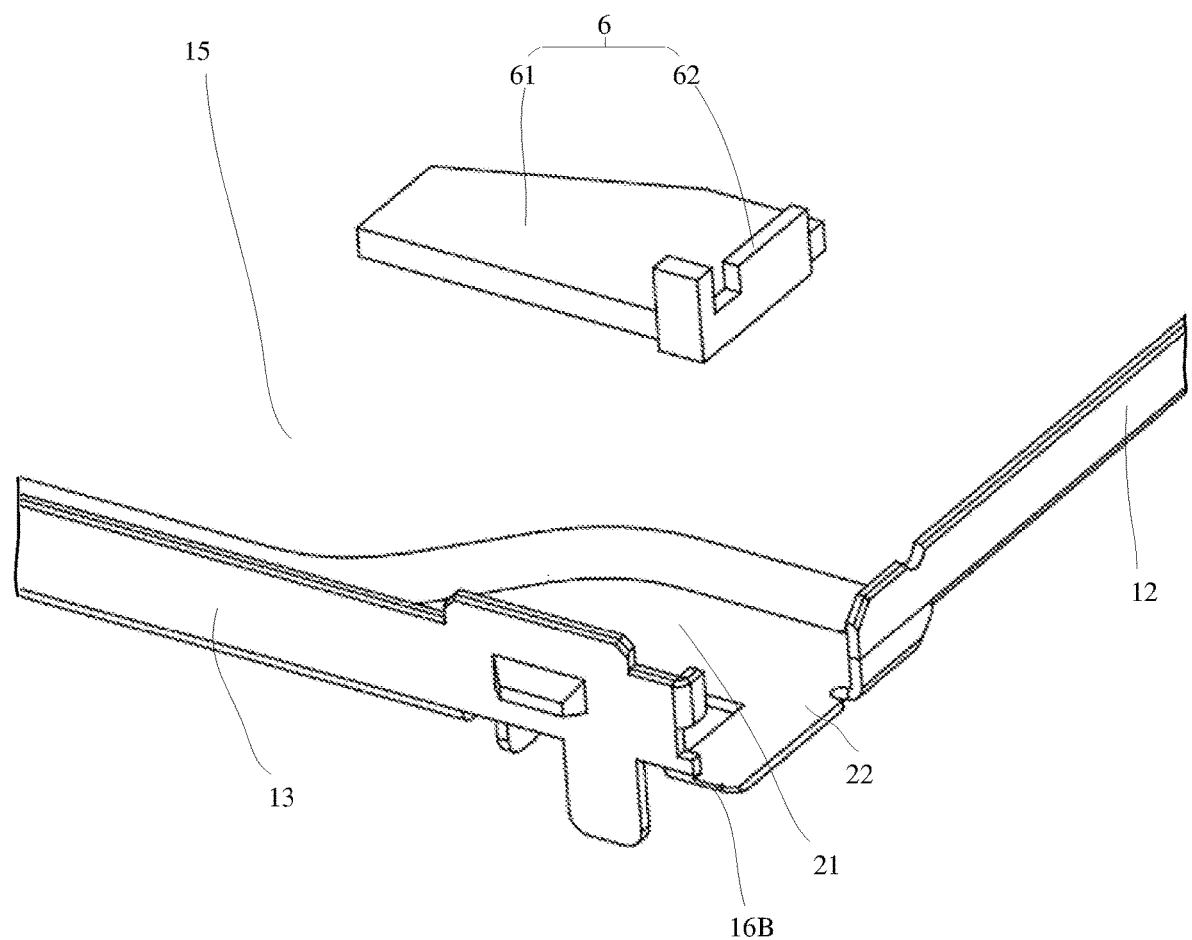
FIG. 20 is a partial enlarged view of a back plate assembly according to some embodiments of the present disclosure, at a second corner.

Optionally, the back plate assembly may have a different structure at the corner 16B from at the corner 16A. FIG. 20 is a partial enlarged view of the back plate assembly according to some embodiments of the present disclosure, at the second corner 16B. With reference to FIGS. 7, 9 and 20, the second buffer member 6 may include a bottom plate portion 61 and a side wall 62, and the bottom plate portion 61 is vertically connected to the side wall 62. The bottom plate portion 61 may be received by the sink 21, that is, the bottom plate portion 61 is accommodated in the sink 21. The side wall 62 may be disposed in the notch 22 to shield the notch 22, thereby preventing light leakage. A size (i.e., thickness) of the bottom plate portion 61 in the Z direction is no greater than a size (i.e., depth) of the sink 21 in the Z direction, so that the bottom plate portion 61 may be completely accommodated in the sink 21.

Optionally, a double-sided adhesive tape is provided between the bottom plate portion 61 and the sink 21. Specifically, a double-sided adhesive tape is provided on a surface of the bottom plate portion 61 facing the sink 21 to bond the bottom plate portion 61 and the bottom plate 15 of the back plate 1, so that the second buffer member 6 is positioned and fixed on the back plate 1.

Figure 21:
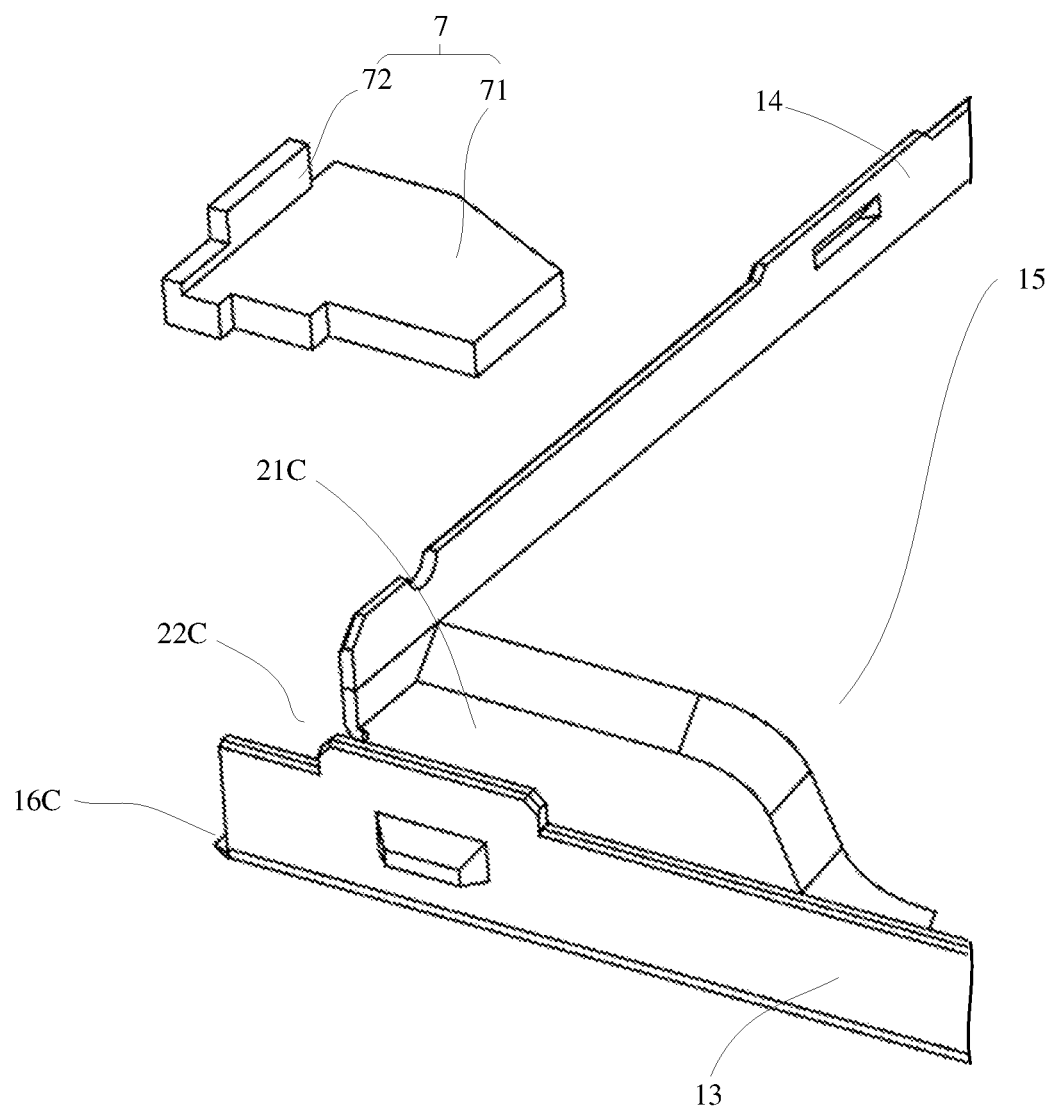
FIG. 21 is a partial enlarged view of a back plate assembly according to some embodiments of the present disclosure, at a third corner.

Optionally, the back plate assembly may have the same structure at the corner 16C as at the corner 16B. FIG. 21 is a partial enlarged view of the back plate assembly according to some embodiments of the present disclosure, at the third corner 16C. With reference to FIGS. 8, 9 and 21, the third buffer member 7 may include a bottom plate portion 71 and a side wall 72, and the bottom plate portion 71 is vertically connected to the side wall 72. The bottom plate portion 71 may be received by the sink 21C, that is, the bottom plate portion 71 is accommodated in the sink 21C. The side wall 72 may be disposed in the notch 22C to shield the notch 22C, thereby preventing light leakage. A size (i.e., thickness) of the bottom plate portion 71 in the Z direction is no greater than a size (i.e., depth) of the sink 21C in the Z direction, so that the bottom plate portion 71 may be completely accommodated in the sink 21C.

Optionally, a double-sided adhesive tape is provided between the bottom plate portion 71 and the sink 21C. Specifically, the double-sided adhesive tape is provided on a surface of the bottom plate portion 71 facing the sink 21C to bond the bottom plate portion 71 and the bottom plate 15 of the back plate 1, so that the third buffer member 7 is positioned and fixed on the back plate 1.

For example, the back plate assembly according to the embodiments of the present disclosure may have the structure including the receiving slot and the insertion portion at two corners (i.e., the first corner 16A and the fourth corner 16D) located on the sky side, specifically, it may have the structure shown in FIG. 11 at the first corner 16A, and the structure shown in FIG. 19C at the fourth corner 16D. The back plate assembly may have the structure including the sink and the bottom plate portion at two corners (i.e., the second corner 16B and the third corner 16C) located on the ground side, specifically, it may have the structure shown in FIG. 20 at the second corner 16B, and the structure shown in FIG. 21 at the third corner 16C.

Figure 22:
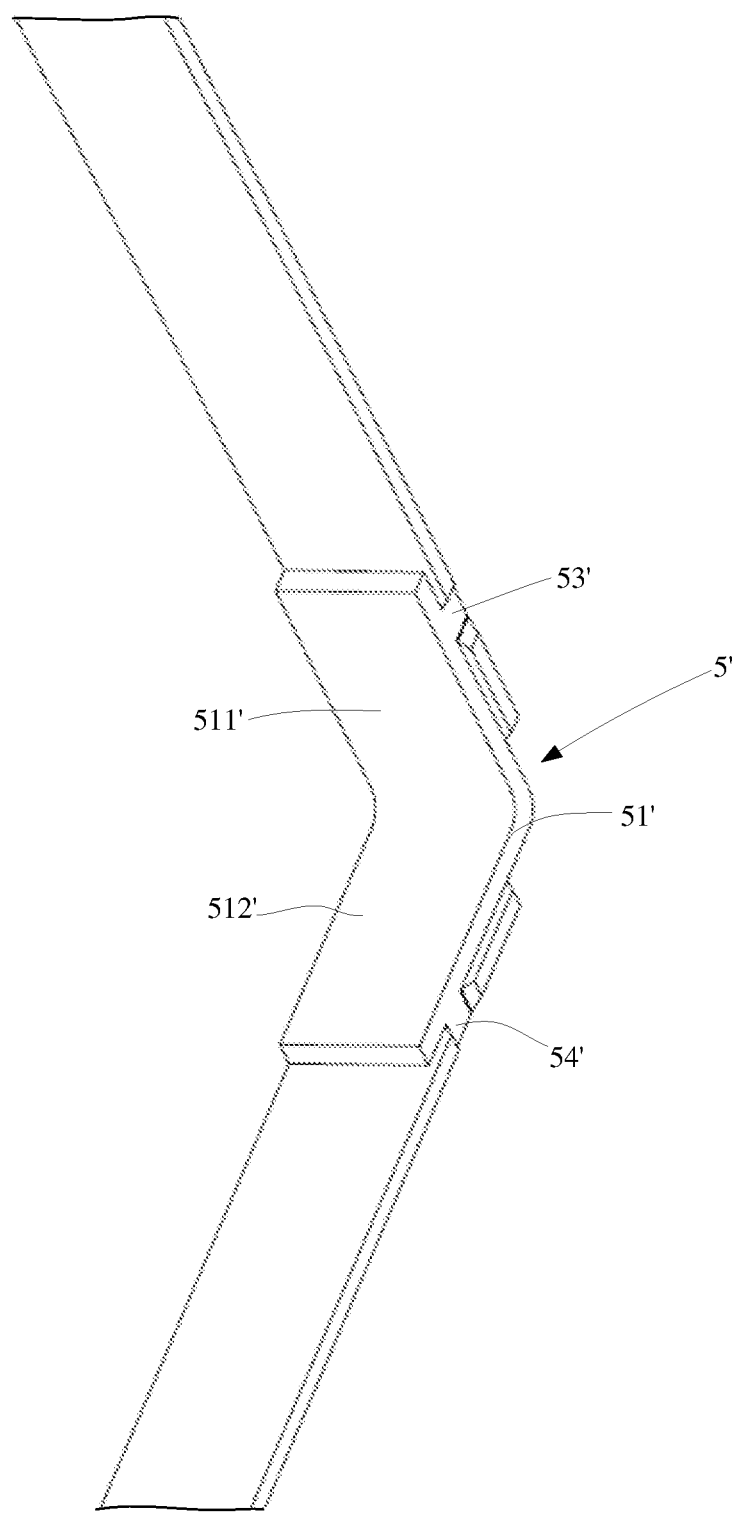
FIG. 22 is a partial enlarged view of a back plate assembly according to some embodiments of the present disclosure, at a corner.
Figure 23:
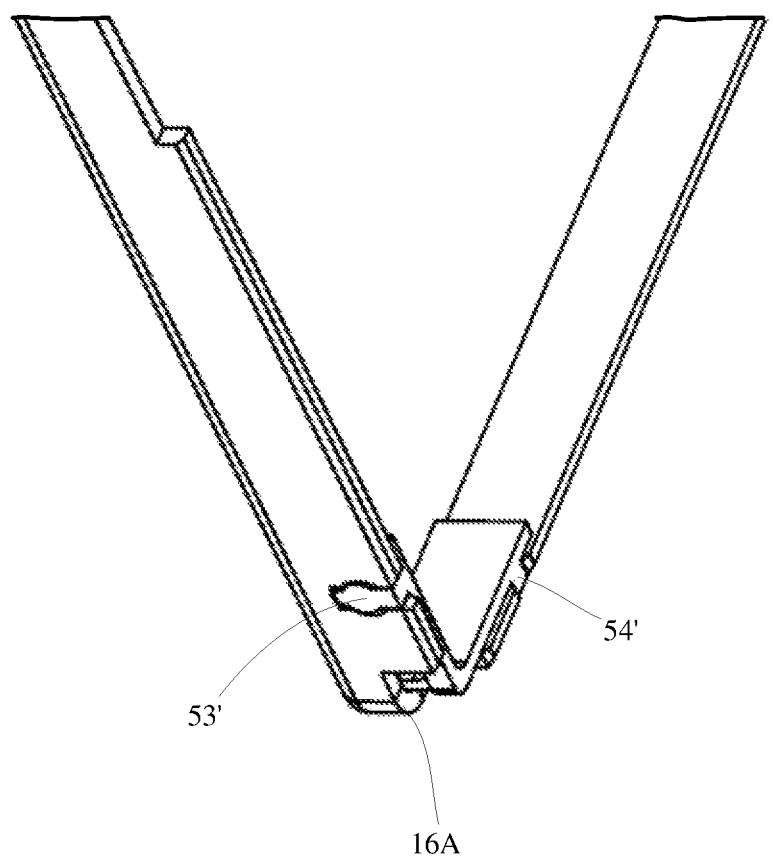
FIG. 23 is a partial enlarged view of a back plate assembly according to some embodiments of the present disclosure at a corner, from another perspective.

FIG. 22 is a partially enlarged view of the back plate assembly according to some embodiments of the present disclosure at a corner, and FIG. 23 is a partially enlarged view of the back plate assembly according to some embodiments of the present disclosure at the corner when viewed from another perspective. For example, FIG. 22 and FIG. 23 may be partial enlarged views of the back plate assembly at the first corner 16A.

Optionally, referring to FIG. 22 and FIG. 23, the first buffer member 5' may include a first body 51', a first insertion portion 53', and a second insertion portion 54'. The first buffer member 5' may omit the second body 52 located on the outer side. Except for this, a structure of the first buffer member 5' is the same as that of the first buffer member 5 described in the above embodiments.

Optionally, the first body 51' includes a first arm 511' and a second arm 512'. A double-sided adhesive tape is provided between the first arm 511' and the first side plate 11 to bond the first arm 511' and the first side plate 11. A double-sided adhesive tape is provided between the second arm 512' and the second side plate 12 to bond the second arm 512' and the second side plate 12.

With reference to FIG. 1, FIG. 9, and FIG. 11, some embodiments of the present disclosure further provide a backlight module. The backlight module includes the back plate assembly, a backlight source 210, and an optical element. The optical element may include a light guide plate 220. The light guide plate 220 may be positioned on a support surface which is formed collectively by the coplanar platform 56, first top surface 511S, and second top surface 512S.

In the embodiments of the present disclosure, the buffer member may be well positioned and fixed on the back plate, and position and support the optical element in the accommodation space 1S well, and there is no need to provide an additional structure on the side plate of the back plate to position the optical element.

Moreover, in some embodiments of the present disclosure, it is not necessary to provide a sink in the bottom plate 15 of the back plate 1 to place the buffer member, so that the thickness of the bottom plate may be reduced, thereby reducing the total thickness of the backlight module.

In the embodiments of the present disclosure, the buffer members are each composed of an elastic material such as silicone or rubber. In this way, the buffer members may buffer the optical element in the accommodation space 1S.

In addition, the buffer members are respectively disposed at the four corners of the back plate, and may respectively shield the notches at the corners of the back plate, so that they may not only prevent light emitted by the backlight module from leaking through the notches, but also prevent foreign objects from entering the backlight module, that is, the buffer member may function to prevent light leakage and seal the backlight module.

Referring back to FIGS. 1 and 2, the back plate assembly included in the display device 100 may be the back plate assembly according to any one of the embodiments of the present disclosure. As described above, in the back plate assembly, the buffer members may be positioned and fixed on the back plate by means of insertion, provide good positioning and support for the optical element, and it is not necessary to provide an additional structure on the side plate of the back plate to position the optical element. In this way, it is beneficial to realize a display device with a narrow frame or even a frameless display device.

Optionally, in the display device according to the embodiments of the present disclosure, the back plate assembly may have a structure including the receiving slot and the insertion portion at two corners (i.e., the first corner 16A and the fourth corner 16D) located on the sky side, specifically, it may have the structure shown in FIG. 11 at the first corner 16A, and the structure shown in FIG. 19C at the fourth corner 16D. Moreover, the back plate assembly may have the structure including the sink and the bottom plate portion at two corners (i.e., the second corner 16B and the third corner 16C) located on the ground side, specifically, it may have the structure shown in FIG. 20 at the second corner 16B, and the structure shown in FIG. 21 at the third corner 16C. In this way, a narrow frame or even no frame may be realized at the first side frame 101, the third side frame 103, and the fourth side frame 104, that is, a display device with the narrow frame at three sides or a display device which is frameless at three sides may be realized.

Optionally, in the display device according to the embodiments of the present disclosure, the back plate assembly may have the structure including the receiving slot and the insertion portion at the four corners 16A, 16B, 16C, 16D. In this way, narrow frame or even no frame may be realized at the first side frame 101, the second side frame 102, the third side frame 103, and the fourth side frame 104, that is, a display device with the narrow frame at four sides or a display device which is frameless at four sides may be realized.

For example, the display device in each of the embodiments described above may be a vehicle-mounted display device applied to a moving object such as a car, or may be a display device such as a notebook computer. Of course, the embodiments of the present disclosure are not limited thereto. For example, the display device may be a product or component with a display function, such as a smart phone, a wearable smart watch, smart glasses, a tablet computer, a television, a display, a digital photo frame, a navigator, a vehicle-mounted display, an e-book, and the like.

Although some embodiments according to the general inventive concept of the present disclosure have been shown and described, those skilled in the art will understand that changes can be made to these embodiments without departing from the principle and spirit of the general inventive concept. Thus, the scope of the present disclosure shall be defined by appending claims and their equivalents.

What is claimed is:

1. A back plate, comprising:
    a bottom plate;
    a plurality of side plates on the same side of the bottom plate, wherein an accommodation space enclosed by both the bottom plate and the plurality of side plates is formed, the plurality of side plates comprise a first side plate, and the first side plate comprises an inner surface facing the accommodation space; and
    a plurality of receiving slots, wherein the plurality of receiving slots are respectively located in the plurality of side plates, and the plurality of receiving slots comprise a first receiving slot in the first side plate,
    wherein, the first receiving slot penetrates the first side plate in a first direction, and the first direction is perpendicular to the inner surface of the first side plate;
    the first receiving slot comprises a slot opening and a slot bottom, the slot opening is located on a side of the first receiving slot distal to the bottom plate in a second direction, the slot bottom is located on a side of the first receiving slot near the bottom plate in the second direction, the bottom plate comprises an inner surface facing the accommodation space, and the second direction is perpendicular to the inner surface of the bottom plate;
    the first receiving slot comprises a receiving head, a positioning portion and a receiving tail, and the receiving head, the positioning portion and the receiving tail are sequentially arranged from the slot bottom toward the slot opening in the second direction; and
    a size of at least a part of the positioning portion in a third direction is greater than a size of each of the receiving head and the receiving tail in the third direction, and the third direction is perpendicular to both the first direction and the second direction.

2. The back plate according to claim 1, wherein the back plate comprises a first corner, the plurality of side plates further comprise a second side plate, and the second side plate is connected with the first side plate at the first corner; and the plurality of receiving slots further comprise a second receiving slot in the second side plate.

3. The back plate according to claim 2, wherein the second receiving slot penetrates the second side plate in the third direction;

the second receiving slot comprises a slot opening and a slot bottom, the slot opening of the second receiving slot is located on a side of the second receiving slot distal to the bottom plate in the second direction, and the slot bottom of the second receiving slot is located on a side of the second receiving slot near the bottom plate in the second direction;

the second receiving slot comprises a receiving head, a positioning portion and a receiving tail, and the receiving head, the positioning portion and the receiving tail of the second receiving slot are sequentially arranged from the slot bottom of the second receiving slot toward the slot opening of the second receiving slot in the second direction; and a size of at least a part of the positioning portion of the second receiving slot in the first direction is greater than a size of each of the receiving head and the receiving tail of the second receiving slot in the first direction.

4. The back plate according to claim 3, wherein the first receiving slot further comprises a first slot wall and a second slot wall, the first slot wall and the second slot wall are respectively located on opposite sides of the first receiving slot in the third direction, and the first slot wall and the second slot wall each comprise a circular arc surface portion at the positioning portion of the first receiving slot; and/or the second receiving slot further comprises a first slot wall and a second slot wall, the first slot wall of the second receiving slot and the second slot wall of the second receiving slot are respectively located on opposite sides of the second receiving slot in the first direction, and the first slot wall of the second receiving slot and the second slot wall of the second receiving slot each comprise a circular arc surface portion at the positioning portion of the second receiving slot.

5. The back plate according to claim 4, wherein an orthographic projection of the circular arc surface portion of the first slot wall of the first receiving slot on the first side plate and an orthographic projection of the circular arc surface portion of the second slot wall of the first receiving slot on the first side plate are concentric; and/or an orthographic projection of the circular arc surface portion of the first slot wall of the second receiving slot on the second side plate and an orthographic projection of the circular arc surface portion of the second slot wall of the second receiving slot on the second side plate are concentric.

6. The back plate according to claim 4, wherein the first slot wall of the first receiving slot and the second slot wall of the first receiving slot each comprise a planar surface portion at the receiving head of the first receiving slot, and the first slot wall of the first receiving slot and the second slot wall of the first receiving slot each comprise a planar surface portion at the receiving tail of the first receiving slot; and/or the first slot wall of the second receiving slot and the second slot wall of the second receiving slot each comprise a planar surface portion at the receiving head of the second receiving slot, and the first slot wall of the second receiving slot and the second slot wall of the second receiving slot each comprise a planar surface portion at the receiving tail of the second receiving slot.

7. The back plate according to claim 2, further comprising a first notch at the first corner, wherein the first notch is spaced apart from the first receiving slot, and the first notch is spaced apart from the second receiving slot.

8. The back plate according to claim 3, wherein the back plate further comprises a second corner, a third corner and a fourth corner, the plurality of side plates further comprise a third side plate and a fourth side plate, the second side plate is connected with the third side plate at the second corner, the third side plate is connected with the fourth side plate at the third corner, and the fourth side plate is connected with the first side plate at the fourth corner; and the plurality of receiving slots further comprise a third receiving slot and a fourth receiving slot which both are adjacent to the second corner, the third receiving slot is disposed in the third side plate, the fourth receiving slot is disposed in the second side plate, the third receiving slot has the same structure as the first receiving slot, and the fourth receiving slot has the same structure as the second receiving slot; and/or, the plurality of receiving slots further comprise a fifth receiving slot and a sixth receiving slot which both are adjacent to the third corner, the fifth receiving slot is disposed in the third side plate, the sixth receiving slot is disposed in the fourth side plate, the fifth receiving slot has the same structure as the first receiving slot, and the sixth receiving slot has the same structure as the second receiving slot; and/or, the plurality of receiving slots further comprise a seventh receiving slot and an eighth receiving slot which both are adjacent to the fourth corner, the seventh receiving slot is disposed in the first side plate, the eighth receiving slot is disposed in the fourth side plate, the seventh receiving slot has the same structure as the first receiving slot, and the eighth receiving slot has the same structure as the second receiving slot.

9. The back plate according to claim 3, wherein the back plate further comprises a second corner, the plurality of side plates further comprise a third side plate, and the second side plate is connected with the third side plate at the second corner; and the back plate further comprises a sink at the second corner, and the sink is located in the bottom plate.

10. A back plate assembly, comprising:
the back plate according to claim 2; and
a plurality of buffer members comprising a first buffer member,
wherein at least a part of the first buffer member is adapted to be inserted into the first receiving slot and the second receiving slot.

11. The back plate assembly according to claim 10, wherein the first buffer member comprises:
a first body comprising:
a first arm on a side of the first side plate facing the accommodation space; and
a second arm on a side of the second side plate facing the accommodation space;
a second body comprising:

a third arm on a side of the first side plate facing away from the accommodation space; and a fourth arm on a side of the second side plate facing away from the accommodation space;

a first insertion portion between the first arm and the third arm, the first insertion portion being adapted to be inserted into the first receiving slot; and a second insertion portion between the second arm and the fourth arm, the second insertion portion being adapted to be inserted into the second receiving slot.

12. The back plate assembly according to claim 10, wherein the first buffer member comprises:

a first body comprising:

a first arm on a side of the first side plate facing the accommodation space; and a second arm on a side of the second side plate facing the accommodation space;

a first insertion portion on a side of the first arm facing away from the accommodation space, the first insertion portion being adapted to be inserted into the first receiving slot; and a second insertion portion on a side of the second arm facing away from the accommodation space, the second insertion portion being adapted to be inserted into the second receiving slot.

13. The back plate assembly according to claim 11, wherein the first insertion portion comprises an insertion head, a positioning part and an insertion tail, and a size of at least a part of the positioning part in the third direction is greater than a size of each of the insertion head and the insertion tail in the third direction.

14. The back plate assembly according to claim 13, wherein the first buffer member comprises an elastic material.

15. The back plate assembly according to claim 14, wherein the positioning part of the first insertion portion is elastically deformable under a pressing action to pass through the receiving tail of the first receiving slot, and is restorable in response to removing the press action to be clamped on the positioning portion of the first receiving slot.

16. The back plate assembly according to claim 13, wherein the size of the insertion head in the third direction is no greater than the size of the receiving head in the third direction, the size of the positioning part in the third direction is no greater than the size of the positioning portion in the third direction, and the size of the insertion tail in the third direction is no greater than the size of the receiving tail in the third direction.

17. The back plate assembly according to claim 16, wherein the positioning part comprises two circular arc surface parts, the two circular arc surface parts of the positioning part are located on opposite sides of the positioning part in the third direction, orthographic projections of the two circular arc surface parts of the positioning part on the first arm are concentric.

18. The back plate assembly according to claim 16, wherein the back plate further comprises a second corner, a third corner and a fourth corner, the plurality of side plates further comprise a third side plate and a fourth side plate, the second side plate is connected with the third side plate at the second corner, the third side plate is connected with the fourth side plate at the third corner, and the fourth side plate is connected with the first side plate at the fourth corner; and the plurality of buffer members further comprise a second buffer member adjacent to the second corner, a third buffer member adjacent to the third corner, and a fourth buffer member adjacent to the fourth corner, and at least one of the second buffer member, the third buffer member and the fourth buffer member is identical in structure to the first buffer member.

19. The back plate assembly according to claim 11, wherein the first arm comprises a first top surface distal to the bottom plate in the second direction, the second arm comprises a second top surface distal to the bottom plate in the second direction, and the first top surface and the second top surface respectively extend to the second body to form a platform; and the first buffer member further comprises an avoiding notch at the first corner, and the avoiding notch is located on an inner surface of the second body facing the accommodation space.

20. A backlight module, comprising the back plate assembly according to claim 10.

* * * * *